US012735280B2

(12) United States Patent
Kuhmichel et al.

(10) Patent No.: US 12,735,280 B2
(45) Date of Patent: Sep. 15, 2026

(54) HANDLING OF FOOD PRODUCTS

(71) Applicant: WEBER FOOD TECHNOLOGY SE & CO. KG, Breidenbach (DE)

(72) Inventors: Christoph Kuhmichel, Bad Laasphe (DE); Marco Nichau, Bad Laasphe (DE); Franziska Rupp, Breidenbach (DE); Andreas Runkel, Biedenkopf (DE); Matthias Rink, Bad Endbach (DE); Michael Knauf, Amöneburg-Mardorf (DE)

(73) Assignee: WEBER FOOD TECHNOLOGY SE & CO. KG, Breidenbach (DE)

( * ) Notice: Subject to any disclaimer, the term of this patent is extended or adjusted under 35 U.S.C. 154(b) by 560 days.

(21) Appl. No.: 18/103,888

(22) Filed: Jan. 31, 2023

(65) Prior Publication Data

US 2023/0271796 A1 Aug. 31, 2023

(30) Foreign Application Priority Data

Feb. 4, 2022 (DE) ......................... 102022102713.9
Apr. 14, 2022 (DE) ......................... 102022109288.7

(51) Int. Cl.
*B65G 61/00* (2006.01)
*B65B 49/14* (2006.01)
(Continued)

(52) U.S. Cl.
CPC .............. *B65G 61/00* (2013.01); *B65B 49/14* (2013.01); *B65G 15/46* (2013.01); *B65G 35/06* (2013.01);
(Continued)

(58) Field of Classification Search
CPC ......... B65B 25/06; B65B 49/14; B65G 15/46; B65G 35/06; B65G 61/00; B65G 2201/0202
See application file for complete search history.

(56) References Cited

U.S. PATENT DOCUMENTS 4,003,184 A * 1/1977 Shiu ...................... B65B 25/065 264/296
4,342,182 A * 8/1982 Dennis .................... B65B 49/16 493/418
(Continued)

FOREIGN PATENT DOCUMENTS

CA 2771570 A1 * 9/2012 ............... B65B 9/04
DE 102016108212 A1 11/2017
(Continued)

OTHER PUBLICATIONS

Translation of European Search Report dated May 22, 2023 corresponding to European Patent Application No. 23154383.6, 18 pages.

*Primary Examiner* — Eyamindae C Jallow
(74) *Attorney, Agent, or Firm* — Dickinson Wright PLLC

(57) ABSTRACT

The invention relates to a method of handling food products, in which at least one respective product is placed onto a carrier that has a base and a tab pivotable relative to the base about a kink line, the carrier together with the product disposed thereon is fed to a pick-up region that is disposed in a working region of a transfer device, and the carrier together with the product disposed thereon is picked up by the transfer device, is then fed by means of the transfer device to an insertion region of a packaging machine, and is inserted there with a downward movement of the transfer device into a package component, wherein the carrier is moved past a folding contour, which is arranged in the insertion region, during the downward movement and in so
(Continued)

Figure 1:
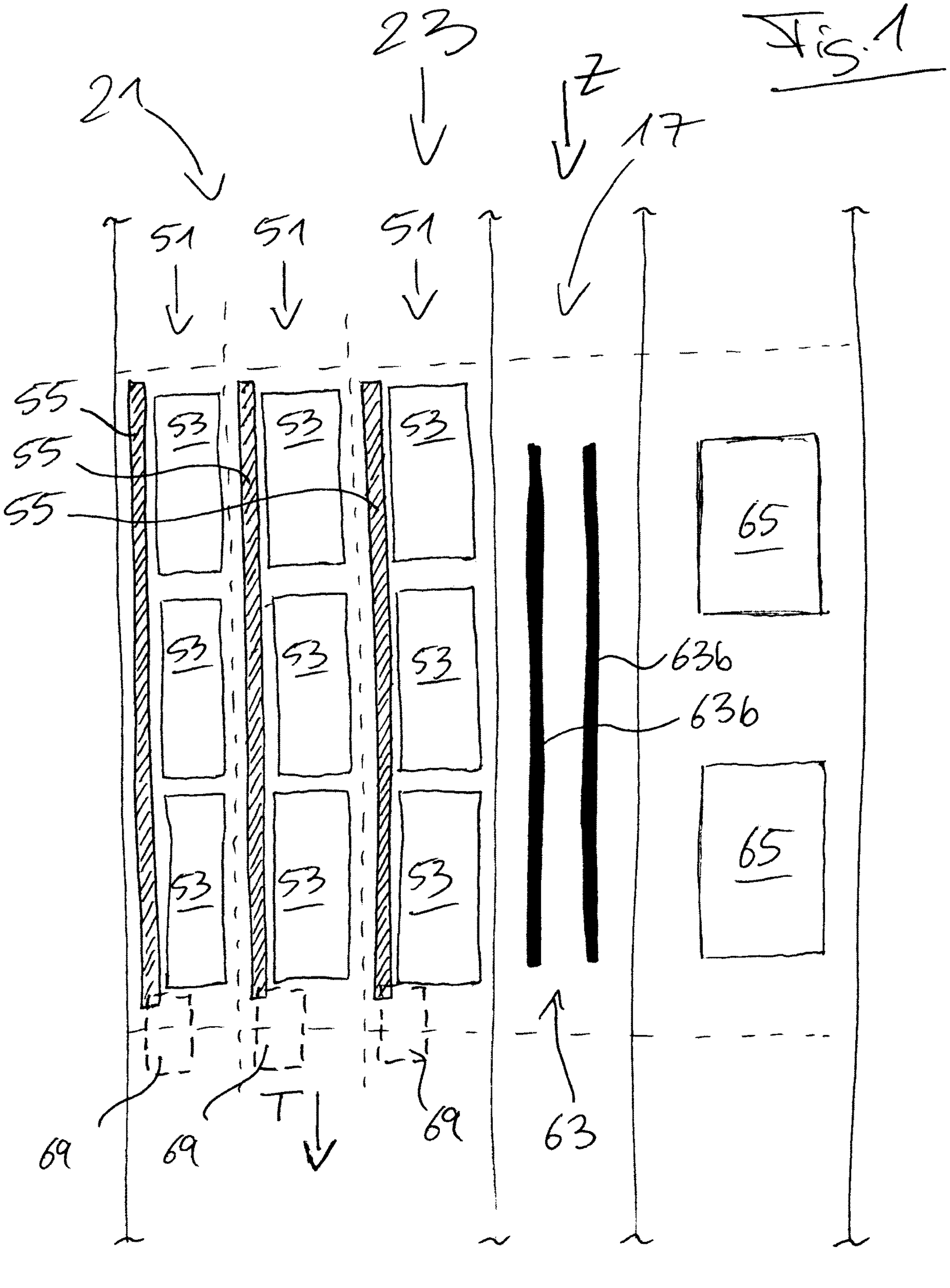

doing, on the one hand, the tab is pivoted relative to the base by cooperation with the folding contour and, on the other hand, the carrier is secured against lifting by a holding device of the transfer device that is effective at or in the region of the kink line.

15 Claims, 13 Drawing Sheets

(51) Int. Cl.
*B65G 15/46* (2006.01)
*B65G 35/06* (2006.01)
*B65B 25/06* (2006.01)

(52) U.S. Cl.
CPC ...... *B65B 25/06* (2013.01); *B65G 2201/0202* (2013.01)

(56) References Cited

U.S. PATENT DOCUMENTS

| | | | | | |
|---|---|---|---|---|---|
| 5,768,857 | A * | 6/1998 | Ward | B65B 11/10 | 53/531 |
| 5,996,861 | A * | 12/1999 | Propach | B65B 63/04 | 223/37 |
| 9,663,254 | B2 * | 5/2017 | Sdahl | B65B 49/10 | |
| 2012/0192526 | A1 * | 8/2012 | Spix | B65B 25/065 | 53/396 |
| 2012/0291399 | A1 * | 11/2012 | Bonneville | B65B 9/04 | 53/203 |
| 2017/0320606 | A1 | 11/2017 | Kuhmichel et al. | | |
| 2017/0320678 | A1 | 11/2017 | Gerhardt et al. | | |
| 2022/0297948 | A1 * | 9/2022 | Harding | B65G 47/244 | |

FOREIGN PATENT DOCUMENTS

| | | | |
|---|---|---|---|
| DE | 102016108213 | A1 | 11/2017 |
| EP | 3505879 | A1 | 7/2019 |

* cited by examiner 21
23
Z
17
51
51
51
55
55
55
53
53
53
53
53
53
53
53
53
65
65
636
636
69
69
69
T
63

HANDLING OF FOOD PRODUCTS

CROSS-REFERENCES TO RELATED APPLICATIONS

This application claims the benefit of German Application No. 102022109288.7, filed on Apr. 14, 2022 and German Application No. 102022102713.9, filed on Feb. 4, 2022. The entire disclosures of the applications referenced above are incorporated herein by reference.

The invention relates to a method of handling food products, in which at least one respective product is placed onto a carrier that has a base and a tab pivotable relative to the base about a kink line, the carrier together with the product disposed thereon is fed to a pick-up region that is disposed in a working region of a transfer device, and the carrier together with the product disposed thereon is picked up by the transfer device, is then fed by means of the transfer device to an insertion region of a packaging machine, which insertion region is likewise disposed in the working region of the transfer device, and is inserted there with a downward movement of the transfer device into a package component.

The invention furthermore relates to a transfer device and a packaging machine.

Such methods and apparatus are generally known. The food products to be handled are, for example, portions that comprise one or more stacked or shingled slices cut off from a food product, e.g. ham, sausage or cheese. The cutting off of the slices from the food in particular takes place using an automatic slicing machine, in particular a so-called high-performance slicer. Such machines are capable of cutting off slices from one or simultaneously from a plurality of bar-like or loaf-like food products arranged next to one another at a high speed, and indeed at a cutting speed of some hundred to a plurality of thousand slices per minute.

The carriers are in particular flat, preferably at least approximately rectangular, plate-like structures that, for example, consist of cardboard, paper, or plastic. The base of such a product carrier typically has a significantly larger area than the tab. Such carriers are also designated as L boards with respect to their cross-sectional shape when the tab is pivoted. Due to the tab pivoted about the kink line, the product disposed on the base is at least partly covered.

In practice, in a total production line, the portions that are particular produced by a high-performance slicer are placed onto the carriers in a device arranged downstream of the slicer and are then fed to a packaging machine which likewise belongs to the production line and in which in each case the arrangement of carrier and product is packaged.

Packaging machines for such product carriers are generally known so that they do not have to be looked at in detail here. By means of the packaging machine, individual or still contiguous trays to be separated later, for example so-called trays, or depressions previously formed by deep drawing in a material web, for example a plastic film, can e.g. be fed to the respective insertion region. There, a handling device that is preferably configured as a robot and that comprises a transfer device, which is in particular formed by a robot gripper, can place the carriers that were each previously picked up at the pick-up region together with the product disposed thereon into a respective package component, e.g. into a tray or a depression.

The pick-up region to which the carriers together with the products disposed thereon are fed is, for example, formed by a conveyor band that extends in parallel with the transport direction of the packaging machine, that can be supported at the packaging machine, and that can thus form a component of the packaging machine. In general, however, it is also possible for a pick-up region to be formed by a separate feed device. The feeding of the carriers, in each case together with the product disposed thereon, takes place such that the pick-up region and the insertion region of the packaging machine are located in the working region of the transfer device.

The transfer device can be formed by a pick-and-place robot, also designated as a "picker", whose manipulator, for example, comprises one or more claws that are movable relative to one another and that can grip under a respective carrier and can thus pick it up together with the product disposed thereon and can place it above a package component of the packaging machine again in order to insert the carrier together with the product disposed thereon into the package component. A plurality of such transfer devices can be arranged behind one another in the transport direction of the packaging machine.

Against this background, it is understood that when using the product carriers in question here, it is necessary to fold these carriers before the insertion into the package component in each case, i.e. to pivot the tab relative to the base, and indeed with the product disposed on the base.

Different methods of folding product carriers e.g. configured as L boards have already been proposed. As regards the prior art in this respect, reference is, for example, made to DE 10 2016 108 212 A1 and DE 10 2016 108 213 A1.

Against the background described above, it is an object of the invention to provide a possibility of handling food products in which the tab of the carrier can in each case be pivoted relative to the base of the carrier in a simple and reliable manner.

This object is in each case satisfied by the features of the claims.

In the method in accordance with the invention, provision is made that the carrier is moved past a folding contour, which is arranged in the insertion region, during the downward movement and in so doing, on the one hand, the tab is pivoted relative to the base by cooperation with the folding contour and, on the other hand, the carrier is secured against lifting by a holding device of the transfer device that is effective at or in the region of the kink line.

In the other method in accordance with the invention, provision is made that the carrier is folded or pre-folded prior to the insertion into the package component by pivoting the tab relative to the base by means of a pivot device integrated into the transfer device, and wherein, during the pivoting of the tab, the carrier is secured against lifting by a holding device of the transfer device that is effective at or in the region of the kink line.

In the first-mentioned method, the pivoting of the tab takes place by a cooperation of the transfer device and the packaging machine, wherein the relative movement that anyway takes place during the downward movement of the transfer device is utilized to pivot the tab of the respective carrier in that the carrier is moved past a folding contour arranged in the insertion region of the packaging machine such that the tab of the carrier abuts the folding contour and is thus pivoted by the latter. The arrangement of the folding contour relative to the package components and the programming of the movement of the transfer device can take place such that the downward movement of the transfer device takes place at exactly the right spacing from the folding contour.

This concept for folding product carriers is therefore characterized, on the one hand, by the cooperation of the transfer device and the packaging machine, wherein the packaging machine is provided with the mentioned folding contour for this purpose. On the other hand, this concept is characterized in that the transfer device is also provided with a holding device that is effective at or in the region of the kink line of a respective carrier disposed thereon. Thus, the holding device is effective precisely at the required position, namely at or in the region of the kink line, and indeed such that the carrier cannot lift off if, during the downward movement for insertion into the package component, the tab is acted on by the folding contour at the insertion region of the packaging machine.

In the other concept of the invention, the pivoting of the tab takes place by the transfer device itself. For this purpose, the transfer device is provided with an integrated pivot device. Here, too, the transfer device is furthermore characterized in that a holding device is provided that is effective at or in the region of the kink line of a respective carrier disposed thereon and thus ensures that the carrier does not lift off when its tab is pivoted.

Transfer devices in the form of robot grippers are known that are provided with a holding-down device. However, they are product holding-down devices that secure a product from slipping during the pick-up when claws of the gripper are pushed under the product. Furthermore, such holding-down devices serve to fix a picked-up product during the transfer, for example, from a pick-up region to an insertion region. Such holding-down devices can also be used when the products to be handled are disposed on carriers of the kind in question here, wherein these holding-down devices are not specifically effective at or in the region of the kink line between the base and the tab to secure the carrier against lifting.

Irrespective of whether the tab is pivoted by cooperation with a folding contour provided at the insertion region of the packaging machine or by means of a pivot device integrated into the transfer device, the holding device, which is effective specifically at the correct position, i.e. at or in the region of the kink line, ensures that the carrier is secured against lifting when its tab is pivoted.

Accordingly, the transfer device in accordance with the invention is characterized in that, in addition to a support for a respective carrier, it has a holding device that is arranged and configured to secure the carrier against lifting off from the support. As will be discussed in more detail elsewhere, the support is formed by at least one claw that can be brought under the base of a respective carrier to pick up the carrier. In this respect, the support is in particular formed by two claws movable relative to one another between an open position and a closed position.

Such a transfer device can be used in accordance with the one concept in accordance with the invention to pivot the tab of a respective picked-up carrier by means of the folding contour at the insertion region of the packaging machine. The transfer device then does not require an integrated pivot device. In a possible further development, the transfer device can be provided with an integrated pivot device that is configured to pivot the tab of a respective carrier relative to the base, said respective carrier being picked up and being secured against lifting by means of the holding device.

The packaging machine in accordance with the invention is inter alia characterized in that the insertion region comprises one or more parallel insertion rows along which the package components can be moved through the insertion region in a transport direction and which each have one or more insertion spaces at which a respective carrier together with the product disposed thereon can be inserted by the transfer device into a package component. A folding abutment projecting upwardly beyond the level of a respective package component is arranged laterally next to each insertion space and defines, with its upper side and its inner side facing the insertion space, a folding contour which a respective carrier abuts with its tab during the downward movement and by which the tab is pivoted relative to the base.

This packaging machine can therefore be used in the first-named concept of the method in accordance with the invention in which the transfer device, with its holding device, and the packaging machine cooperate with the folding contour at the insertion region to pivot the tab of a respective carrier.

If the transfer device has an integrated pivot device for pivoting the tab of a respective carrier, either a folding of the carrier or a pre-folding of the carrier can then take place through this pivoting. "Pre-folding" in this connection means that the tab is pivoted by means of the integrated pivot device into a position relative to the base in which—depending on the specific design of a folding contour arranged at the insertion region of the packaging machine—the tab is additionally pivoted by cooperation with the folding contour during the downward movement for insertion into a respective package component, i.e. is pivoted further beyond a pivot position previously obtained by means of the pivot device integrated into the transfer device.

Therefore, the integrated pivot device of the transfer device and the folding contour arranged at the insertion region of the packaging machine can successively, as a result, together provide a pivoting of the tab.

Generally, within the framework of the present disclosure, a downward movement is not to be understood solely as a pure vertical movement of the transfer device. In its movement for inserting a respective carrier into the package component, the transfer device can also perform movements with a horizontal component, e.g. as mentioned elsewhere in connection with embodiments. The transfer device can also perform a short upward movement during its insertion movement in dependence on the respective conditions. However, since an insertion of the carrier takes place overall, i.e. the transfer device is at a lower level at the moment of the insertion than on the entry into the insertion region of the packaging machine, a downward movement takes place overall so that this designation is chosen for the movement of the transfer device.

Advantageous further embodiments of the methods explained above, of the transfer device, and of the packaging machine are also indicated in the dependent claims, the drawing, and the following description.

Possible further embodiments of the methods in accordance with the invention are set forth in the following.

The movement of the transfer device in the insertion region can generally take place in any desired manner. A pure transverse movement up to above a respective insertion space, followed by a pure downward movement for inserting a respective carrier, is possible but not absolutely necessary. In particular in order to reliably bring the tab of a respective carrier up to the folding contour, provision can, for example, be made that the transfer device is first moved obliquely from top to bottom towards the folding contour and is then at least essentially exclusively moved vertically downwardly, wherein—as described elsewhere—further movements in the transverse direction are not precluded, for example, in connection with a final dropping of the carrier at the end of a respective insertion process.

In some embodiments, provision can be made that the tab is pivoted into a position in which the tab includes an angle of at least approximately 90° with the base. From such a position, the tab can be pivoted further in the direction of the base by means of the packaging machine on a further transport of the package component, for example, by a pivot abutment that is arranged in the insertion region or—with respect to the transport direction—following the insertion region and that defines a pivoting contour that changes in the transport direction. This will be looked at in more detail elsewhere.

The transfer device can be configured such that, during its downward movement, the transfer device moves on a folding path, which is dependent on the folding contour and which deviates from a pure vertical movement, and in so doing aligns the tab at a non-vertically extending operative section of the folding contour in order to pivot the tab beyond an angle of 90° in the direction of the base. For example, transverse movements of the transfer device that extend in the horizontal direction can be intentionally used to also pivot the tab beyond an angle of 90° to the base by a cooperation with the correspondingly shaped folding contour and, in this way, to facilitate or to simplify a possibly required further pivoting of the tab.

If, in accordance with a preferred embodiment, the folding contour is a passive device, which is arranged in a stationary manner, at the packaging machine, the position of the folding contour relative to the respective package component is then known. Consequently, the transfer device can be programmed for an appropriate cooperation with the folding contour in order to move automatically on the required folding path. The transfer device therefore does not require any sensors, such as cameras, in order to effect the respective required cooperation with the folding contour in the sense of an autonomous movement through environment recognition. In general, however, such an autonomous movement through environment recognition is possible for the transfer device in an alternative further development.

In some embodiments, provision can be made that, by moving the transfer device on the folding path, the holding device moves the kink line along at least one operative section of the folding contour that is inclined to the vertical or extends in a curved manner and/or the holding device moves the kink line along an operative section of the folding contour that forms an undercut or a projection. The design of the folding contour consequently provides a variety of possibilities to achieve a respective desired relative position between the tab and the base through the cooperation of the transfer device and the folding contour.

By moving the transfer device and/or by moving the holding device relative to the receiver, in particular relative to one or more claws forming the receiver, the spacing of the holding device, in particular of a holding edge of the holding device that is effective at or in the region of the kink line of the carrier, from the folding contour can be changed. Such transverse movements can be provided as additional movements and can in particular be superposed on the downward movement of the transfer device. However, this is not absolutely necessary since transverse movements of the transfer device or of the holding device can also take place without a simultaneous downward movement of the transfer device. Such movements of the transfer device or of the holding device in the transverse direction or with a component in the transverse direction can be used for a respective cooperation with the folding contour, for example during the final release of a respective carrier, in particular when moving two claws forming the support into the open position. It can hereby, for example, be ensured that the carrier, in particular its tab, is not clamped between the folding contour and the holding device so that the carrier can reliably fall into the package component. Alternatively or additionally, the folding contour can also be designed as movable in order to be moved relative to the receiver and thus to change the spacing from the holding device.

Furthermore, provision can be made that, after the insertion into the package component, the tab is secured against a pivoting back by the folding contour. The folding contour can therefore be arranged relative to the respective package component such that the folding contour prevents the tab from performing an unwanted pivoting back. The folding contour can extend in the transport direction over the entire insertion region or at least along a substantial part of the insertion region so that even during a further transport after the insertion of the carrier into a package component, the folding contour can maintain its securing function of preventing the tab from pivoting back.

As initially mentioned, in some embodiments, provision can be made that, on a further movement of the package component in the packaging machine, the carrier is moved past a pivoting contour of the packaging machine and, in so doing, the tab is pivoted further in the direction of the base by cooperation with the pivoting contour. For example, the pivoting contour can comprise an operative surface that decreases in height, viewed in the transport direction, and that presses the tab downwardly, which has already been pre-folded through the cooperation of the transfer device and the folding contour, in the direction of the base and in particular into contact with the product disposed on the base of the carrier. The shaping of this pivoting contour that is so-to-say configured in the manner of a "folding tunnel" can take place such that the tab, which at the start is positioned perpendicularly upwardly or is at most slightly inclined in the direction of the base, is reliably picked up, i.e. so-to-say "threaded in", in order to then be folded further downwardly by an operative surface of the pivoting contour that is, for example, correspondingly wound.

In some embodiments, provision can be made that, when the carrier is picked up, a respective food product disposed thereon is displaced relative to the carrier by means of the holding device or by means of a positioning device additionally integrated into the transfer device. In this way, it can in particular be ensured that a product at least partly covering the kink line is pushed off from the kink line so that the kink line is exposed and the tab can thus be folded without disturbing the product. This can, for example, take place by means of the holding device in that said holding device can be moved relative to the support of the transfer device, i.e. in particular relative to the claw or to the claws of a robot gripper, or in that the transfer device as a whole is moved relative to the carrier before picking up a respective carrier in order to use the holding device in the manner of a pusher or a rake and to push the respective product from the kink line so that the product is correctly positioned on the base of the carrier.

Alternatively, an additional positioning device can be provided that is movable relative to the support of the transfer device and to the holding device. With such a positioning device additionally integrated into the transfer device, a product disposed on the carrier can, for example, be pushed against the holding device in order, in this way, to achieve a positioning of the product on the carrier oriented towards the holding device or the kink line.

Possible further embodiments of the transfer device in accordance with the invention are set forth in the following.

In some embodiments, provision can be made that the holding device is arranged off-center. It has already been mentioned elsewhere that the transfer device can be provided with a product holding-down device that fixes the product during the picking up of the carrier and/or during the transfer of the carrier to the insertion region. In transfer devices designed in this way, the holding device can be arranged off-center in the sense that it is arranged laterally next to such a product holding-down device.

Irrespective of whether or not the holding device is arranged off-center in the above-mentioned sense, and also irrespective of whether or not a product holding-down device is provided, a further holding device that is fixedly arranged or adjustable can be provided in addition to the holding device that is effective at or in the region of the kink line, wherein this further holding device serves to act on the carrier at a position spaced apart from the kink line in order to secure the carrier against lifting or slipping or twisting.

The transfer device can have a free pivot region at the side of the holding device, in which free pivot region the holding device is the most outwardly disposed component of the transfer device. Such an asymmetrical design of the transfer device can in particular take place through the mentioned off-center arrangement of the holding device. This asymmetry in particular makes it possible that the transfer device can be safely and reliably moved past the folding contour during the downward movement at the insertion region since, during this downward movement, the holding device is the component disposed closest to the folding contour. For this downward movement, it can be desirable for practice that the kink line is moved as close as possible along the folding contour in order to achieve a reliable folding of the tab into the respective predefined position.

As already mentioned elsewhere, the support of the transfer device can be formed by at least one claw that is configured to be brought under the base of a respective carrier in order to pick up the carrier in this manner.

In some embodiments, the support can be formed by two claws movable relative to one another in a direction in parallel with the longitudinal axis of the transfer device between an open position and a closed position. The or each claw can be fork-like and can e.g. have a plurality of tine-like receiving sections.

As regards further developments of the holding device of the transfer device, provision can thus be made that the holding device has a holding edge facing the support and extending in parallel with the longitudinal axis of the transfer device. The securing of the carrier against lifting hereby does not take place by means of an areal region of the holding device, but rather with a holding edge, i.e. a linear holding region. By means of such a holding edge, the holding device can intentionally be effective directly at the kink line. In this respect, it is possible, but not absolutely necessary, for the holding device to act, with its holding edge, on the carrier at the kink line or in the region of the kink line merely in a contacting manner or by applying pressure. In general, it is sufficient if the holding device—regardless of whether it is provided with a holding edge or not—is located at a certain spacing above the carrier. A securing against lifting can also take place with such a spacing apart, i.e. even if there is a certain clearance in the vertical direction for the carrier.

If the holding device is provided with a holding edge, the holding edge can then extend laterally outside the support of the holding device. In this way, the transfer device that is then accordingly asymmetrically designed is so-to-say divided, and indeed into a pick-up region comprising the support for picking up the carrier and into a holding region located laterally next to the pick-up region and comprising the holding device.

To move the kink line of the carrier as closely as possible along the folding contour during the downward movement for insertion into a respective package component and, in so doing, to simultaneously keep a sufficient spacing from the folding contour with the transfer device and in particular with the holding device so that collisions between the transfer device and the folding contour are reliably avoided, the holding device can be shaped accordingly. In this connection, provision can in particular be made that the holding device is set back inwardly in an upper region with respect to a lower region, which comprises the holding edge, in a direction transverse to the longitudinal direction. The holding device can in particular have an outwardly angled lower region whose free lower end is formed by the holding edge.

In a comparatively simple but nevertheless safely and reliably functioning design, the holding device can be formed by a sheet metal part that, for example, extends vertically downwardly in an upper region, with which the sheet metal part is fastened to the transfer device, and merges in a lower region into an outwardly angled section whose lower end forms the holding edge. With the same or at least substantially the same functionality, the holding device can alternatively be made of plastic.

The holding edge can have a rectilinear course. In alternative embodiments, provision can be made that the holding edge is provided with a holding contour that has a plurality of projections disposed on a line. This holding contour can in particular be corrugated or toothed or serrated.

With a holding device having a holding edge of such a design, a respective carrier can be selectively acted on at its kink line and can thus be particularly reliably secured against lifting. In a vertical direction with respect to the support, the holding device can be positioned such that, on a lowering of the transfer device to pick up a respective carrier, the holding device with the mentioned holding contour formed at its holding edge acts on the carrier at the kink line. Carriers that have not already been suitably pre-weakened at the kink line can thus be intentionally weakened, for example pressed in or perforated, by means of the holding contour in order to facilitate the subsequent pivoting of the tab relative to the base of the carrier.

In some embodiments, provision can be made that the holding device is at least approximately effective in a plane that is defined by a support surface of the support. It can hereby be particularly effectively achieved that the holding device can, for example, act on the carrier with an edge-shaped free end in order e.g. to produce the aforementioned weakening of the carrier at the kink line.

Irrespective of the specific design of the holding device, provision can be made that the holding device extends downwardly, starting from a carrier section of the transfer device, and is provided with the holding edge at its free end.

The holding edge can, for example, be sharp-edged or rounded.

The holding device can be at least regionally panel-shaped, i.e. areal. For example, the holding device can, as already mentioned, be formed by a sheet metal part.

In some embodiments, the holding device and/or the attachment of the holding device to the transfer device can be designed such that the holding device is deflectable in a direction transverse to the longitudinal axis under elastic deformation. Due to a corresponding movement of the transfer device and/or due to a corresponding shaping of the folding contour at the insertion region, it can thereby be achieved that, during the downward movement, the holding device is deflected inwardly against a return force that moves the holding device, and thus the carrier acted on or secured by the holding device, into an undercut of the folding contour that is formed in a lower region of the holding contour and that is reached in the course of the further downward movement of the transfer device. A transverse movement of the transfer device towards the folding contour or away from the folding contour does not have to take place for this purpose.

For example, it can be achieved by a run-in slope at the folding contour that, during the downward movement, the holding device is first deflected and then springs back into an undercut of the folding contour at a further downwardly disposed point and in so doing presses the region of the carrier comprising the kink line into the undercut, whereby, on a corresponding shaping of the undercut, the tab is automatically pivoted further in the direction of the base.

In addition to or instead of an undercut, the folding contour can have a projection as an operative section that extends obliquely or in a curved manner. The projection can, for example, have two consecutive part sections that each extend either obliquely or in a curved manner, wherein an upper part section leads inwardly and merges into a lower part section leading back outwardly again. Such a projection can also, with its lower part section, serve to pivot the tab of a respective carrier beyond an angle of 90° relative to the base of the carrier in that the region comprising the kink line of the carrier is moved along the projection by means of the holding device of the transfer device during the downward movement and in so doing enters the region of the lower part section of the projection that acts like an undercut in this respect. A projection has the advantage with respect to an undercut that the risk of a snagging or a catching is reduced to practically zero. A transverse movement of the transfer device towards the folding contour or away from the folding contour also does not have to take place here since the upper part section of the projection provides the deflection of the holding device.

As already mentioned elsewhere, in some embodiments, the transfer device can be provided with a positioning device that is configured, when the carrier is picked up, to displace a respective food product disposed thereon relative to the carrier.

As likewise already mentioned, at least one pivot device can be integrated into the transfer device and is configured to pivot the tab of a respective picked-up carrier, which is secured against lifting by means of the holding device, relative to the base.

In this respect, in order to pivot the tab, the pivot device can be driven to make a working movement between a starting position and an end position. The working movement can be a linear movement or a rotary movement or a pivot movement.

In particular in the case of a linear movement, an arrangement comprising one or more pneumatic cylinders can be provided as the drive for the pivot device. The pivot device can comprise a holder, which is arranged outside a free pivot region of the transfer device, for an inwardly projecting pivoting member, in particular an elongated pivoting member, for pivoting the tab.

Furthermore, provision can be made that the pivot device is movable in a direction in parallel with the longitudinal axis of the transfer device between a passive position, which is disposed outside a free pivot region of the transfer device, and an active position.

The passive position of the pivot device enables an undisturbed positioning of the transfer device relative to the carrier, whereupon the pivot device can be moved into the active position, in order thus in particular to establish a starting position, starting from which the tab, by driving the pivot device, can be pivoted into its end position by moving the pivot device.

The pivot device can be attached to the support of the transfer device, in particular to a claw forming the support. A movement of the claw that in particular takes place to pick up the carrier can hereby be used to simultaneously move the pivot device from a passive position into an active position.

In some embodiments, provision can be made that the support is formed by two claws movable relative to one another in a direction in parallel with the longitudinal axis between an open position and a closed position, wherein each claw carries a pivot device, and wherein the pivot devices are in their passive positions when the claws are in the open position and are in their active positions when the claws are in the closed position.

Possible further embodiments of the packaging machine in accordance with the invention are set forth in the following.

The folding abutment arranged laterally next to each insertion space can be designed as removable from the packaging machine. In the event that products comprising product carriers without a tab to be pivoted or products without product carriers are to be packaged, the packaging machine can consequently be converted by removing the folding abutment so that the folding abutment does not interfere with the insertion of the other products or product carriers.

Furthermore, provision can be made that the position of the folding abutment is adjustable relative to the respective insertion space. An adaptation to the carriers and/or to the package components and/or to the position of the package components at the insertion spaces can hereby take place.

In some embodiments, provision can be made that the folding abutment is arranged at the side of the respective insertion space facing away from the pick-up region.

The folding abutment can be configured as a folding strip extending in the transport direction. The folding strip can in particular extend over a plurality of insertion spaces of the respective insertion row.

In practice, packaging machines often operate on a format by format basis, wherein a format is typically formed by a multi-row and multi-column array of package components that are handled together in the packaging machine, for example produced together by deep-drawing, loaded together with products in an insertion region, and sealed together in a sealing station of the packaging machine by means of a material web, in particular a so-called top film.

Accordingly, in the packaging machine in accordance with the invention, provision can be made that the insertion region comprises a plurality of insertion rows, each having a plurality of insertion spaces, wherein a folding strip extending over a plurality of insertion spaces is arranged at each insertion row. A number of folding strips corresponding to the number of insertion rows is then therefore provided for a respective format. In this respect, a respective folding strip is in particular arranged at the side of the respective insertion row facing away from the pick-up region.

The possible designs of the folding contour are varied and can be selected depending on how the tab of the product carrier is to be pivoted in a respective application.

Thus, provision can, for example, be made that the folding contour extends exclusively vertically, in particular with the exception of a chamfered or rounded inlet section at the upper side of the folding abutment, or that the folding contour comprises a vertically extending operative section.

Alternatively or additionally, provision can be made that the folding contour comprises, at least in an upper region, a non-vertically extending operative section that is directed towards the respective insertion space and that extends at least partly obliquely or in a curved manner. For example, such an operative section can, as already mentioned elsewhere, serve to deflect the holding device of the transfer device against a return force. Such an operative section can alternatively or additionally serve as an inlet section that reliably prevents a collision, which results in a blockage or damage, of the holding device with the folding contour when the transfer device moves downwardly.

Furthermore, in some embodiments, provision can be made that the folding contour at the inner side of the folding abutment comprises at least one operative section configured as an undercut. Such an undercut can, as explained elsewhere, in particular serve to pivot the tab of a respective carrier beyond an angle of 90° relative to the base of the carrier in that the region comprising the kink line of the carrier is intentionally moved into the undercut by means of the holding device of the transfer device during the downward movement in the direction of the respective package component. A corresponding effect can—as already explained above—also be achieved with an operative section configured as a projection.

As likewise already mentioned, the tab of a carrier already inserted into a respective package component can be pivoted further in the direction of the base without the cooperation of the folding contour or of the transfer device in that a pivot abutment, e.g. configured as a "folding tunnel", which defines a pivoting contour changing in the transport direction, is arranged in the insertion region or—with respect to the transport direction—following the insertion region of the packaging machine for the or each insertion row at the packaging machine. This pivoting contour is shaped such that, on a moving past of a respective carrier inserted into a package component, the tab of said respective carrier is pivoted further in the direction of the base of the carrier by cooperation with the pivoting contour.

The pick-up region of the packaging machine can comprise a conveying device via which the carriers, in each case together with the product disposed thereon, can be fed and which, at least in the pick-up region, has a curved support or a support having a reduced width for the carriers, wherein this support enables an overhang of the carriers at both sides. Due to such a design of the conveying device, a safe and reliable pick-up of the fed carriers by means of the transfer device can be ensured.

The conveying device can comprise an endless conveying means, in particular a conveyor band—also designated as a belt band—or a plurality of parallel conveyor belts, that is guided in the pick-up region via a curved guide having a reduced width compared to the endless conveying means. Due to such a curved guide, a curvature in the conveyor band or in the entirety of the parallel conveyor belts can be intentionally produced such that the carriers are each disposed on the conveying means, but project laterally in so doing in order to ensure a safe and reliable pick-up by means of the transfer device.

The curved guide can comprise one or more elevation strips extending in the transport direction for the endless conveying means, wherein these elevation strips each comprise a run-on ramp, a run-out ramp and therebetween an elevated support section for the endless conveying means.

Furthermore, in some embodiments, provision can be made that at least one buffer space for at least one carrier is arranged at the side of the pick-up region facing away from the insertion region of the packaging machine, wherein a respective carrier can, as required, be placed on the buffer space and picked up from the buffer space by means of the transfer device.

If necessary, a carrier fed to the pick-up region can be parked on such a buffer space by means of the transfer device if more carriers are temporarily fed than can be inserted into the package components at the insertion region. When this ratio reverses, the buffer can be emptied again in that a carrier placed at a respective buffer space is used by means of the transfer device.

The buffer space can be provided with a support for the carriers that enables an overhang of the carriers at both sides in order, in this way, to ensure a safe and reliable pick-up by means of the transfer device. This support can, for example, be formed by a plurality of webs spaced apart in parallel.

The packaging machine can comprise a camera system that is capable of detecting the position and the orientation of a respective carrier in the pick-up region and the position and the orientation of a product relative to the carrier. This information can be transmitted to the transfer device. Based on this information, the transfer device can, for example, move the product on the carrier in order e.g.—as mentioned elsewhere—to push a product from the kink line. This can take place by means of the holding device that is, for example, for this purpose attached to the transfer device such that it can be driven to make a movement, i.e. can be moved relative to the holder of the transfer device. In this example, the holding device can therefore be intentionally controlled on the basis of the information provided by the camera system. Alternatively, such a repositioning of a product can also take place by moving the transfer device as a whole, wherein the holding device can here be used as a kind of pusher or rake or another positioning device that is provided in addition to the holding device at the transfer device can be used. Defective products or carriers can also be recognized by means of the camera system and ejected from the start so that they are not picked up by the transfer device at all.

Furthermore, provision can be made that a travel profile is defined for the transfer device in order to avoid collisions when moving from the pick-up region to the insertion region, in particular collisions with the folding contour. To define the travel profile, a detection travel of the transfer device can take place. In particular, the movement of the transfer device can hereby be taught for a respective design, in particular of the insertion region. A camera system can be used for such a "teaching".

In summary, regarding a method of handling food products, in particular the following embodiments may be considered:

1. A method of handling food products,
   - in particular portions that comprise one or more stacked or shingled slices cut off from a food product, e.g. ham, sausage or cheese, in which
     - at least one respective product is placed onto a carrier, in particular an L board, that has a base and a tab pivotable relative to the base about a kink line,
     - the carrier together with the product disposed thereon is fed to a pick-up region that is disposed in a working region of a transfer device, in particular a robot gripper,
     - the carrier together with the product disposed thereon is picked up by the transfer device, is then fed by means of the transfer device to an insertion region of a packaging machine, which insertion region is likewise disposed in the working region of the transfer device, and is inserted there with a downward movement of the transfer device into a package component, in particular into a depression formed in a material web or into a tray, wherein the carrier is moved past a folding contour, which is arranged in the insertion region, during the downward movement and in so doing, on the one hand, the tab is pivoted relative to the base by cooperation with the folding contour and, on the other hand, the carrier is secured against lifting by a holding device of the transfer device that is effective at or in the region of the kink line.

2. A method in accordance with embodiment 1,
wherein the tab is pivoted into a position in which the tab includes an angle of at least approximately 90° with the base.

3. A method in accordance with embodiment 1,
wherein, during its downward movement, the transfer device moves on a folding path, which is dependent on the folding contour and which deviates from a pure vertical movement, and in so doing aligns the tab at a non-vertically extending operative section of the folding contour in order to pivot the tab beyond an angle of 90° in the direction of the base,
in particular wherein, by moving the transfer device on the folding path, the holding device moves the kink line along at least one operative section of the folding contour that is inclined to the vertical or extends in a curved manner and/or the holding device moves the kink line along an operative section of the folding contour that forms an undercut or a projection.

4. A method in accordance with embodiment 3,
wherein, by moving the transfer device and/or by moving the holding device and/or by moving the folding contour relative to the receiver, the spacing of the holding device, in particular of a holding edge of the holding device that is effective at or in the region of the kink line, from the folding contour is changed, in particular in connection with the final release of a respective carrier by the transfer device.

5. A method in accordance with embodiment 1,
wherein, after the insertion into the package component, the tab is secured against a pivoting back by the folding contour.

6. A method in accordance with embodiment 1,
wherein, on a further movement of the package component in the packaging machine, the carrier is moved past a pivoting contour of the packaging machine and, in so doing, the tab is pivoted further in the direction of the base by cooperation with the pivoting contour.

7. A method in accordance with embodiment 1,
wherein, when the carrier is picked up, a respective food product disposed thereon is displaced relative to the carrier by means of the holding device or by means of a positioning device additionally integrated into the transfer device, in particular in order to push the food product from the kink line or to push the food product against the holding device.

Moreover, the following embodiments may be considered:

8. A method of handling food products,
in particular portions that comprise one or more stacked or shingled slices cut off from a food product, e.g. ham, sausage or cheese, in which
at least one respective product is placed onto a carrier, in particular an L board, that has a base and a tab pivotable relative to the base about a kink line,
the carrier together with the product disposed thereon is fed to a pick-up region that is disposed in a working region of a transfer device, in particular a robot gripper,
the carrier together with the product disposed thereon is picked up by the transfer device, is then fed by means of the transfer device to an insertion region of a packaging machine, which insertion region is likewise disposed in the working region of the transfer device, and is inserted there with a downward movement of the transfer device into a package component, in particular into a depression formed in a material web or into a tray,
wherein the carrier is folded or pre-folded prior to the insertion into the package component by pivoting the tab relative to the base by means of a pivot device integrated into the transfer device, and wherein, during the pivoting of the tab, the carrier is secured against lifting by a holding device of the transfer device that is effective at or in the region of the kink line.

9. A method in accordance with embodiment 8,
wherein the carrier is moved past a folding contour, which is arranged in the insertion region, during the downward movement and, in so doing, the tab is pivoted further relative to the base by cooperation with the folding contour.

10. A method in accordance with embodiment 8,
wherein the tab is pivoted into a position in which the tab includes an angle of at least approximately 90° with the base.

11. A method in accordance with embodiment 8,
wherein, during its downward movement, the transfer device moves on a folding path, which is dependent on the folding contour and which deviates from a pure vertical movement, and in so doing aligns the tab at a non-vertically extending operative section of the folding contour in order to pivot the tab beyond an angle of 90° in the direction of the base,
in particular wherein, by moving the transfer device on the folding path, the holding device moves the kink line along at least one operative section of the folding contour that is inclined to the vertical or extends in a curved manner and/or the holding device moves the kink line along an operative section of the folding contour that forms an undercut or a projection.

12. A method in accordance with embodiment 11,
wherein, by moving the transfer device and/or by moving the holding device and/or by moving the folding contour relative to the receiver, the spacing of the holding device, in particular of a holding edge of the holding device that is effective at or in the region of the kink line, from the folding contour is changed, in particular in connection with the final release of a respective carrier by the transfer device.

13. A method in accordance with embodiment 8,
wherein, after the insertion into the package component, the tab is secured against a pivoting back by the folding contour.

14. A method in accordance with embodiment 8,
wherein, on a further movement of the package component in the packaging machine, the carrier is moved past a pivoting contour of the packaging machine and, in so doing, the tab is pivoted further in the direction of the base by cooperation with the pivoting contour.

15. A method in accordance with embodiment 8, wherein, when the carrier is picked up, a respective food product disposed thereon is displaced relative to the carrier by means of the holding device or by means of a positioning device additionally integrated into the transfer device, in particular in order to push the food product from the kink line or to push the food product against the holding device.

Figure 2:
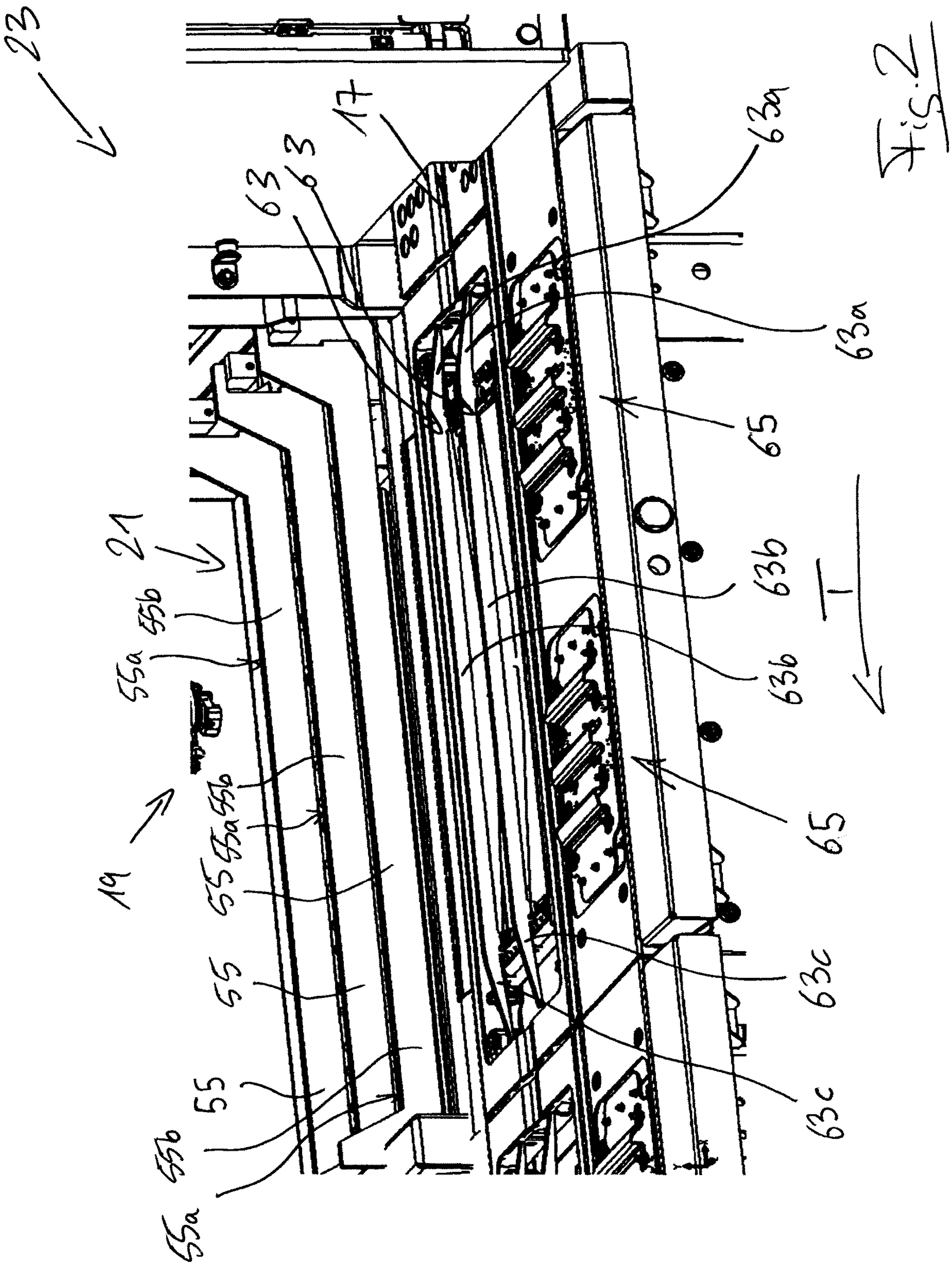
Figure 3:
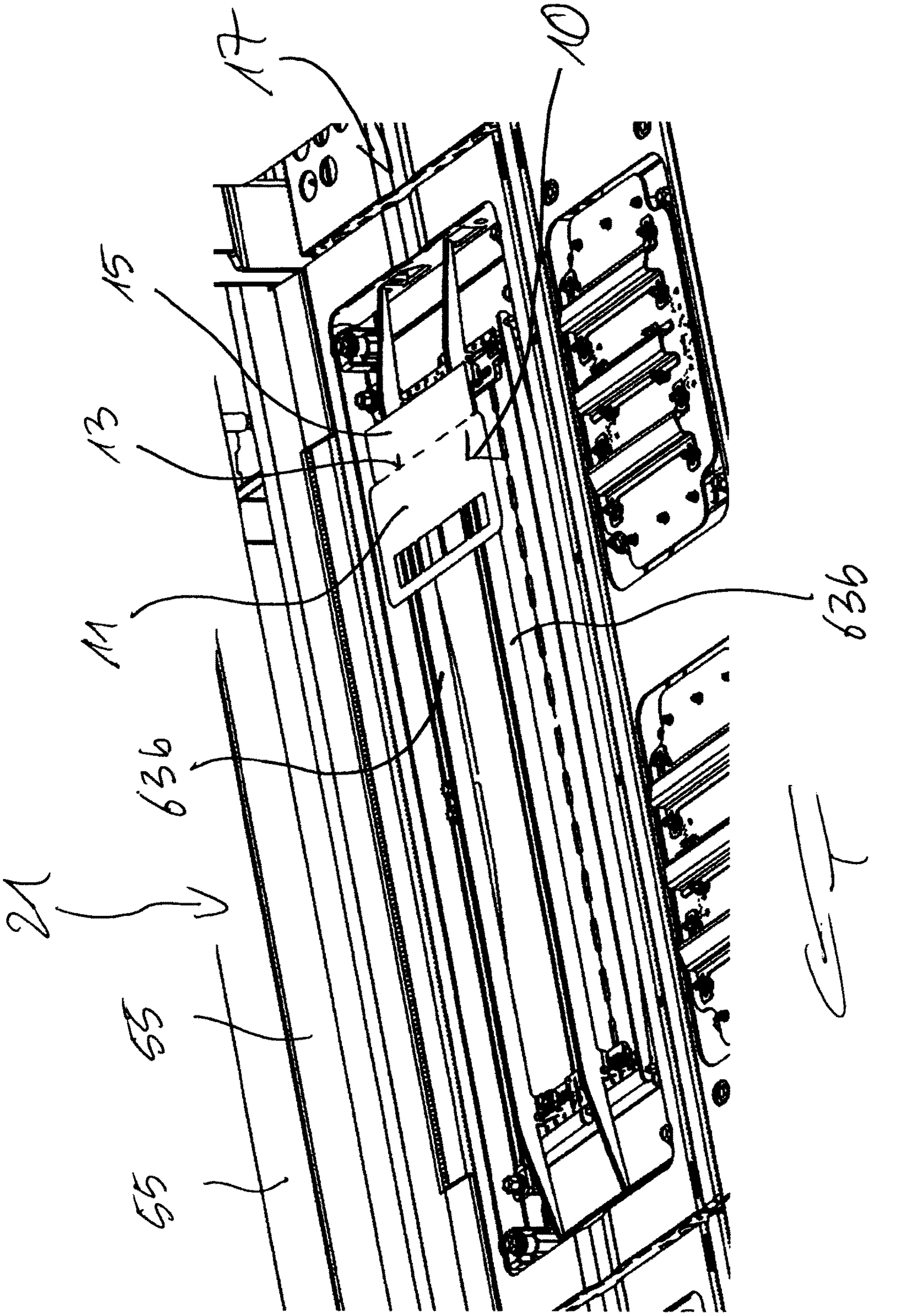
Figure 4:
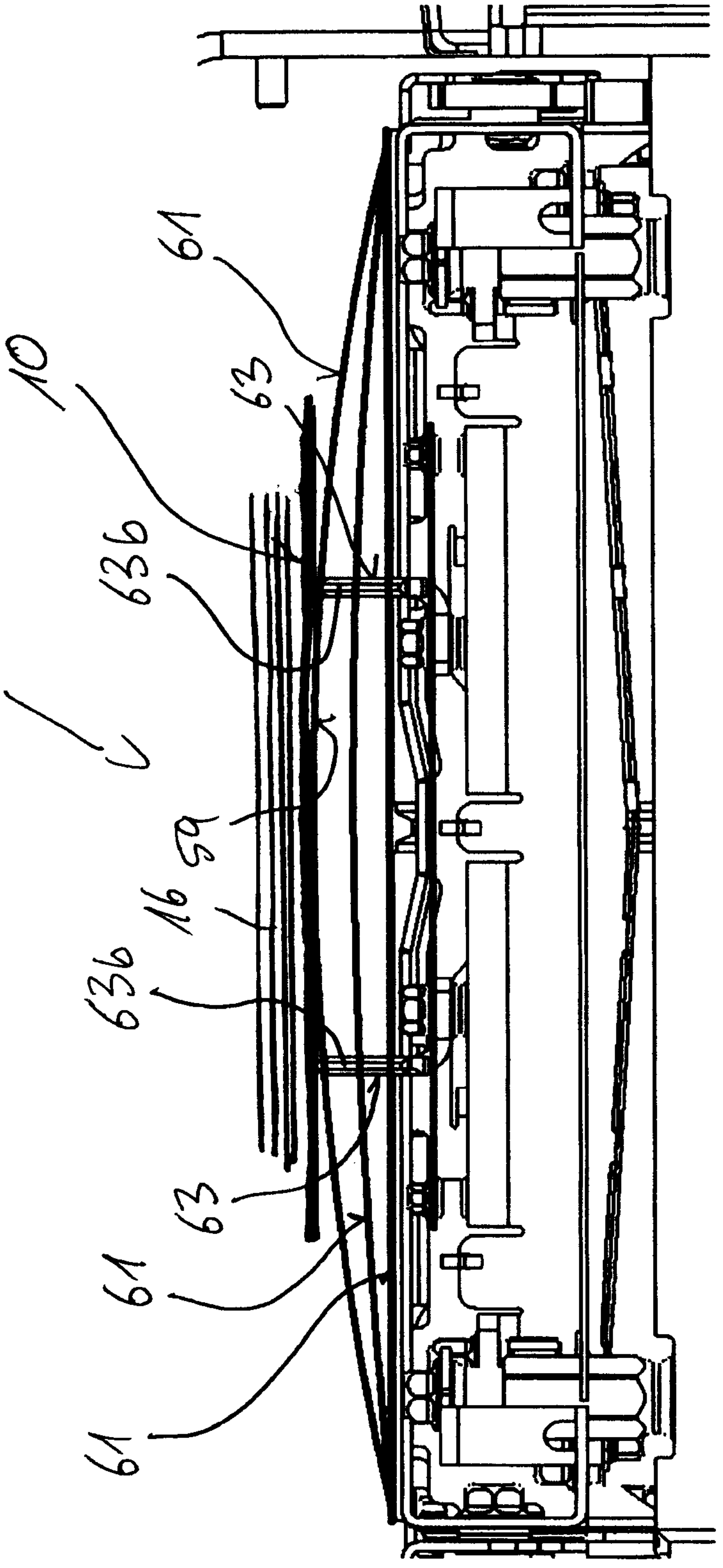
Figure 5:
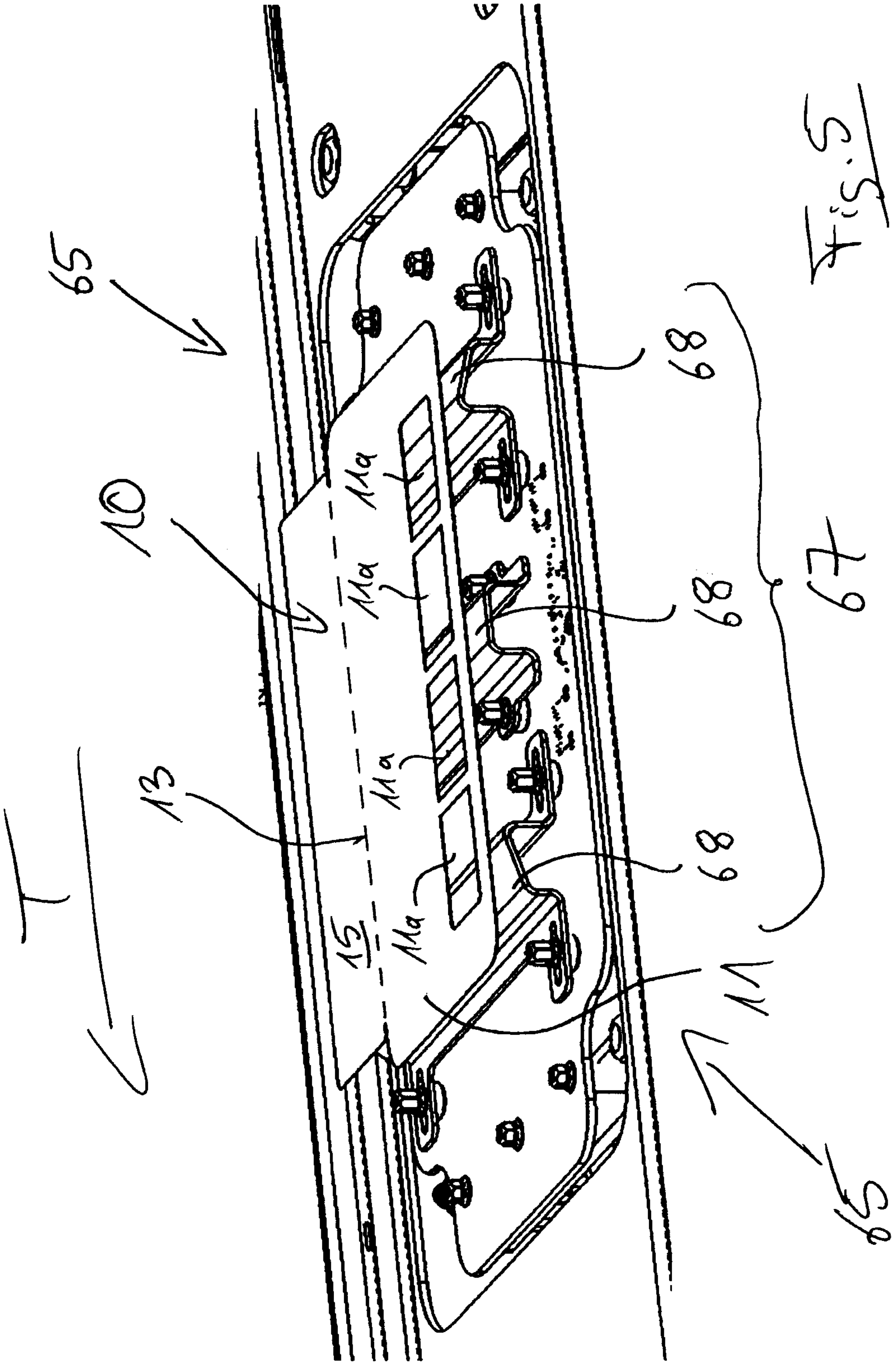
Figure 6A:
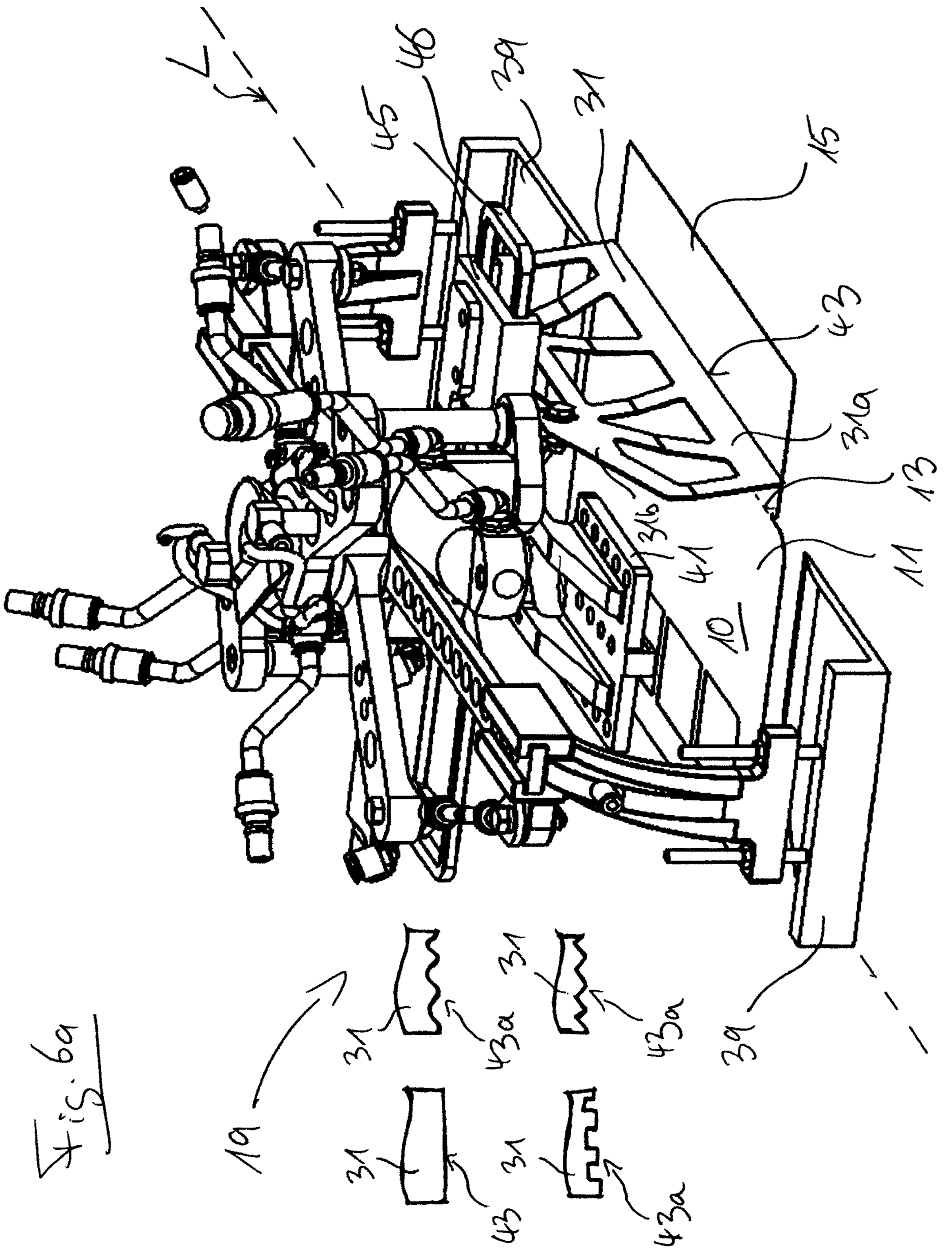
Figure 6B:
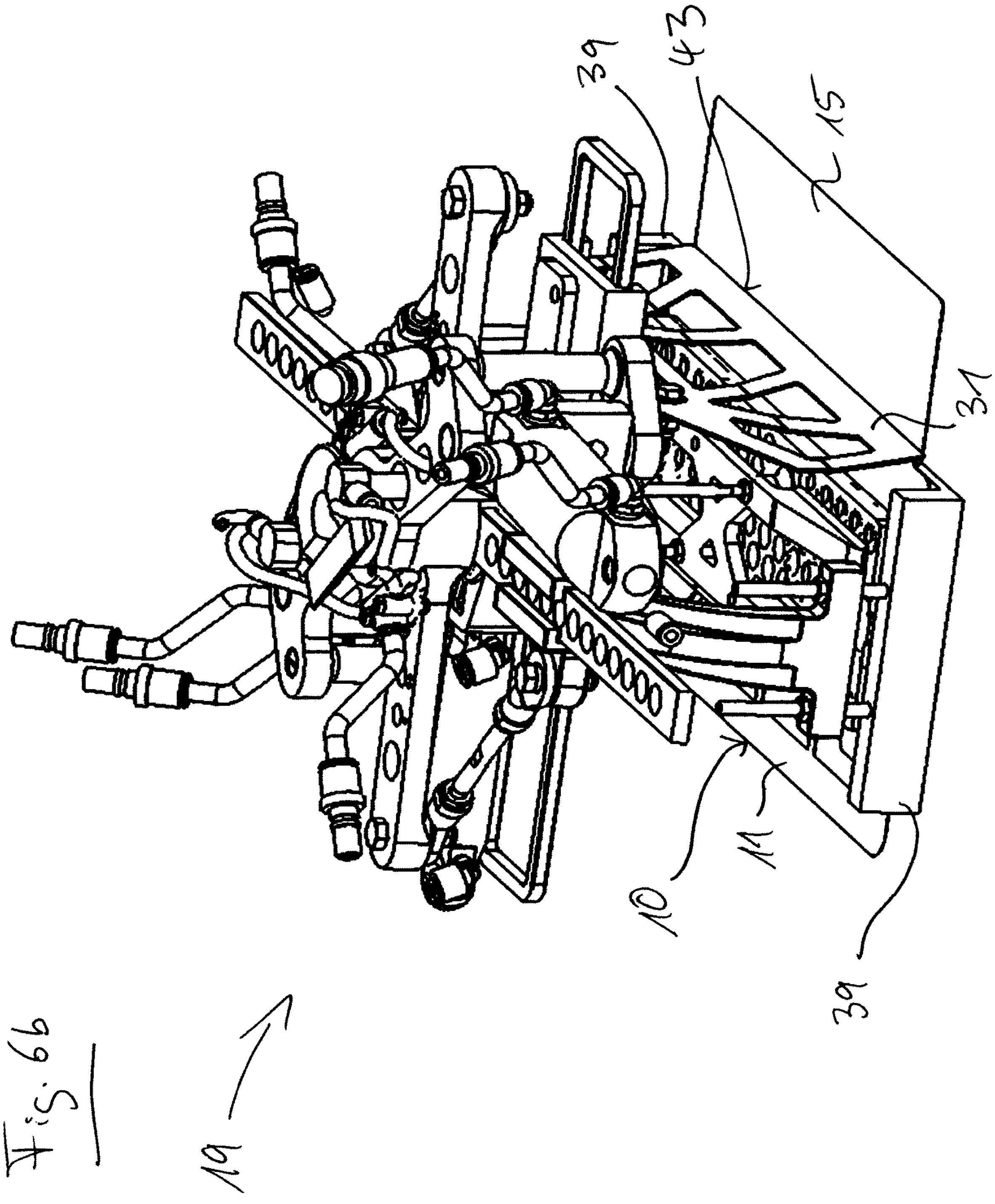
Figure 7A:
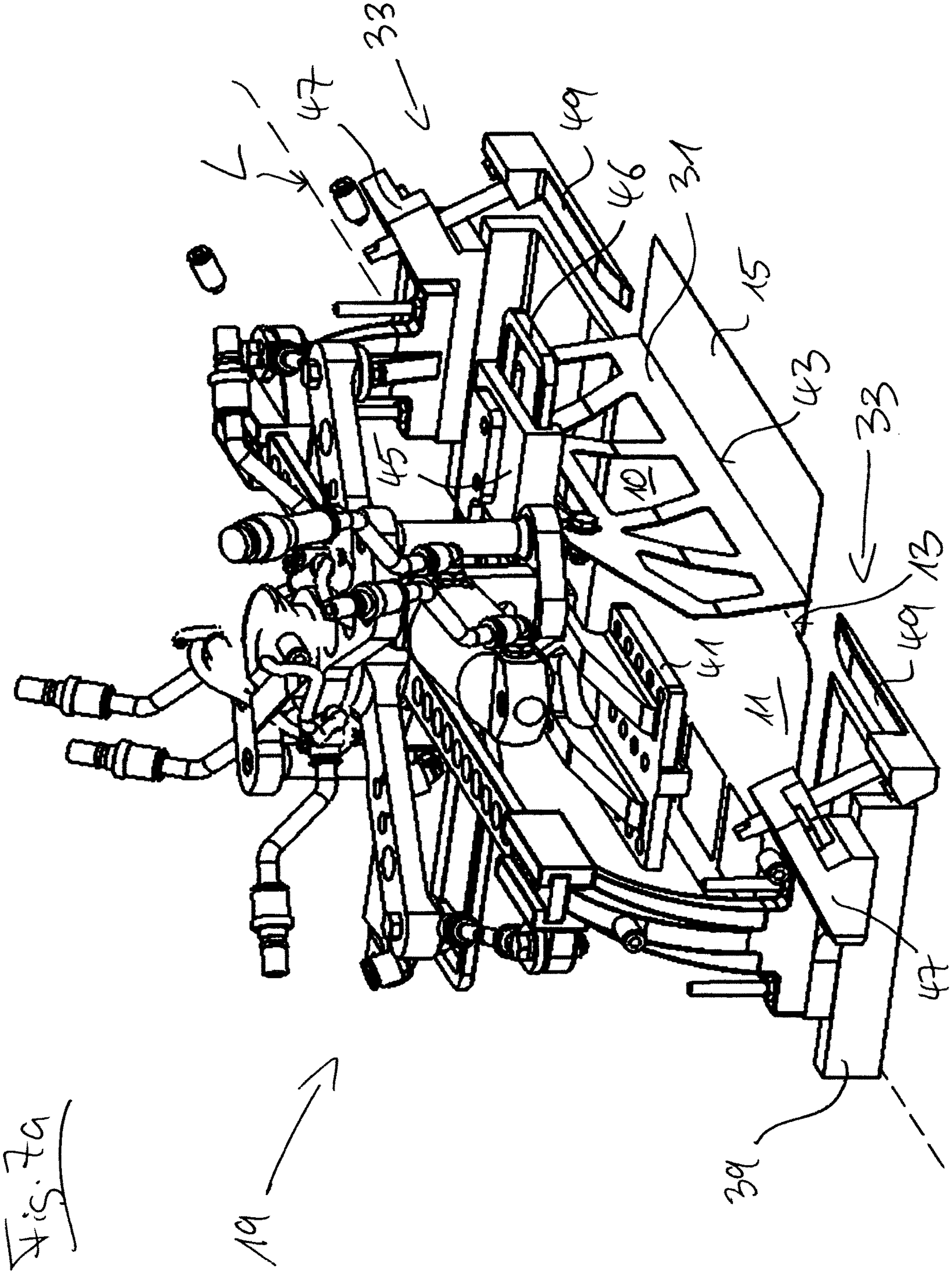
Figure 7B:
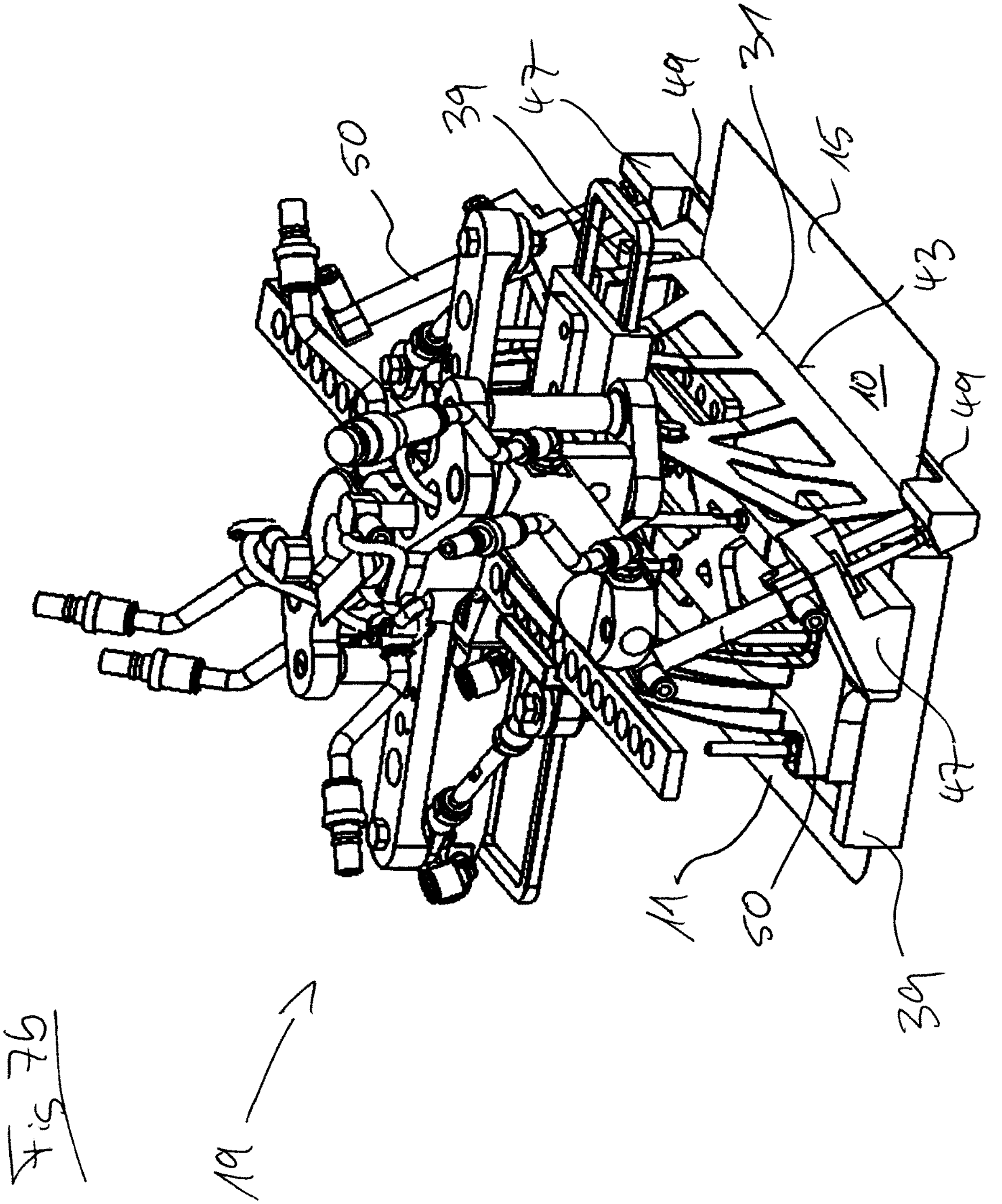
Figure 7C:
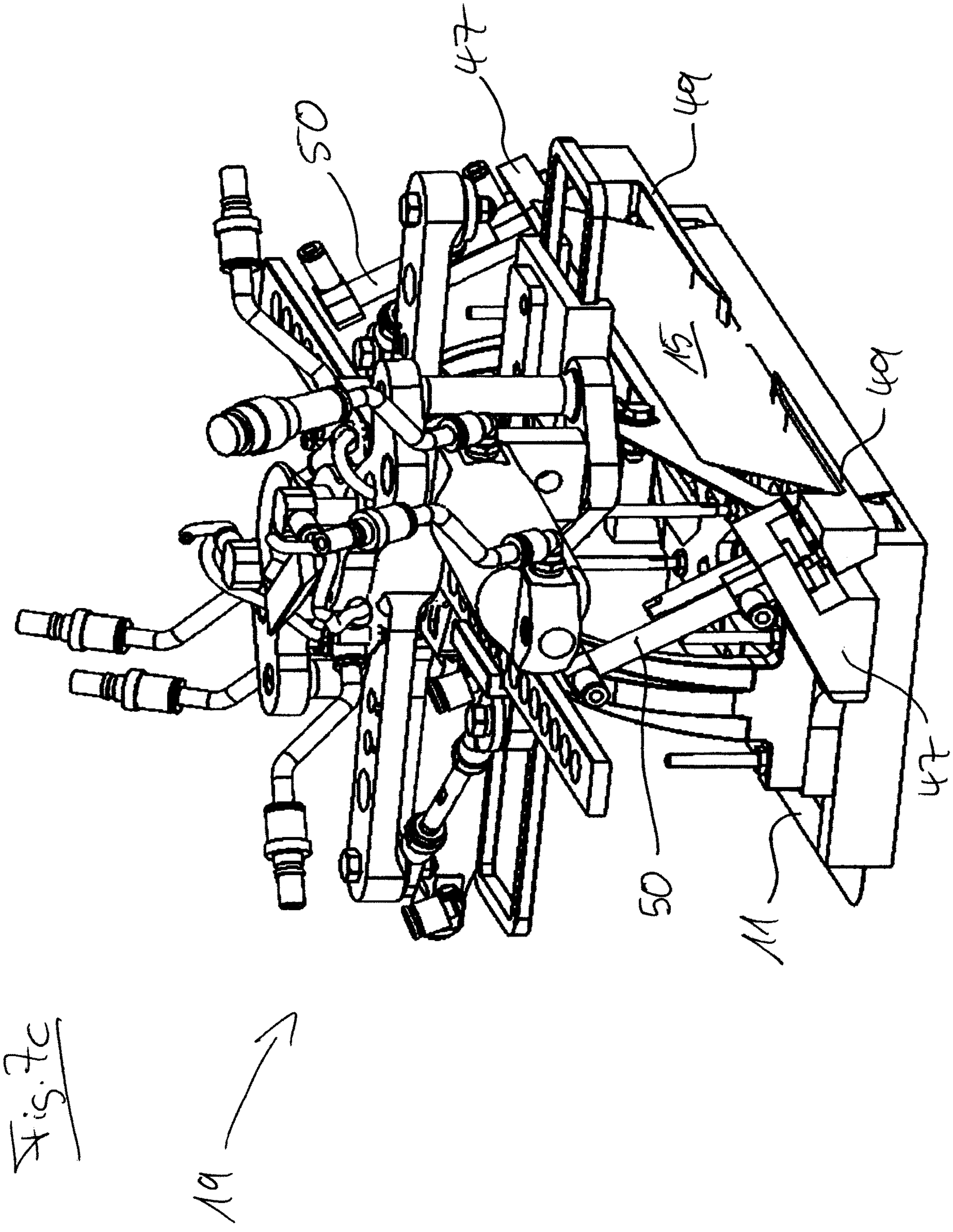
Figure 8:
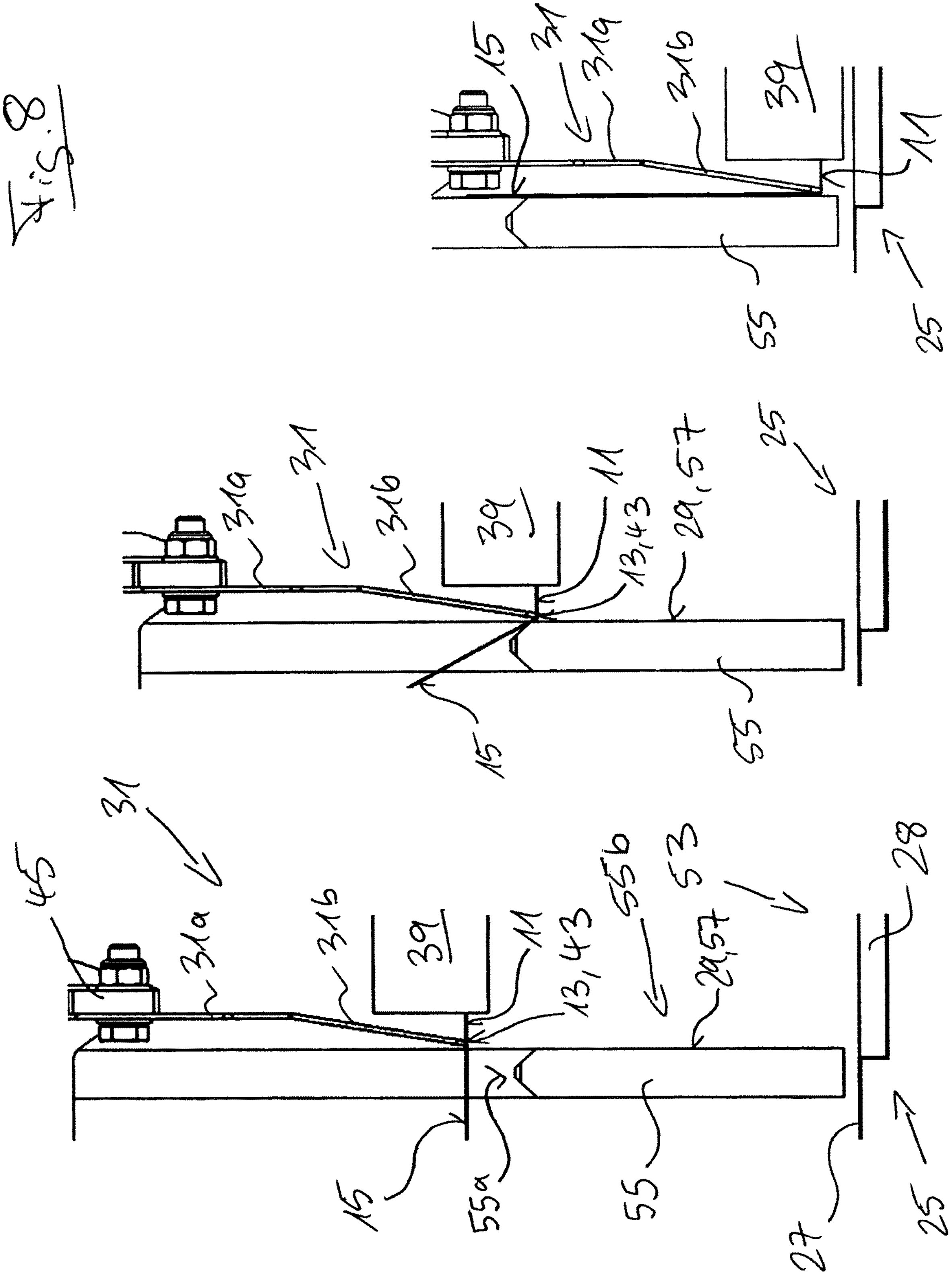
Figure 9:
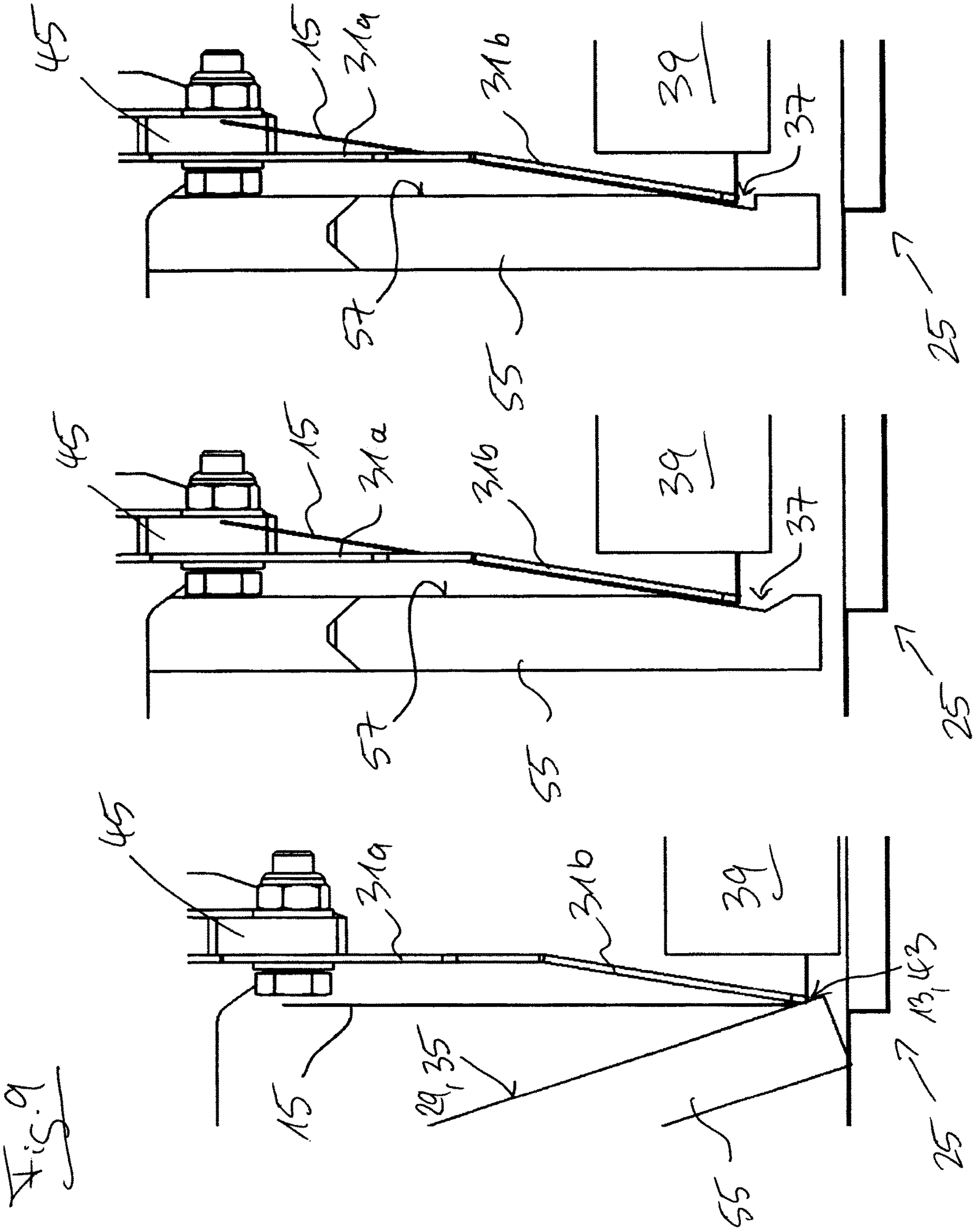
Figure 10:
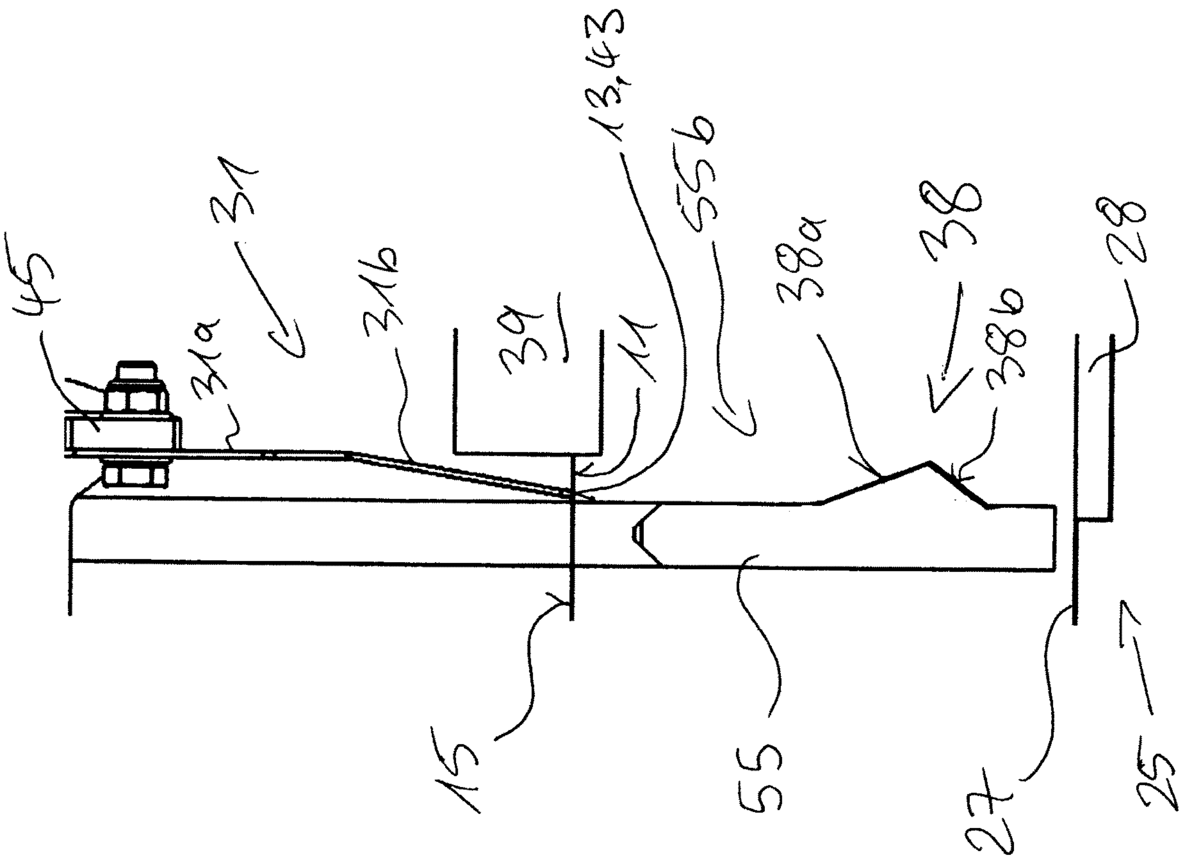

The invention will be described in the following by way of example with reference to the drawing. There are shown:

FIG. 1 schematically, a plan view of a possible embodiment of a packaging machine in accordance with the invention;

FIG. 2 a perspective view of an insertion region together with the pick-up region and buffer spaces of a packaging machine in accordance with a possible embodiment;

FIG. 3 a similar view to FIG. 2, wherein a fed product carrier is shown in the pick-up region for illustration;

FIG. 4 a section perpendicular to the transport direction through the pick-up region of the packaging machine in accordance with FIGS. 2 and 3;

FIG. 5 a product carrier that is disposed on a buffer space of the packaging machine of FIGS. 2 to 4;

FIGS. 6*a* and 6*b* a possible embodiment of a transfer device in accordance with the invention in different positions;

FIGS. 7*a* to 7*c* a further embodiment of a transfer device in accordance with the invention in different positions;

FIG. 8 the cooperation between the holding device of a transfer device and a folding contour of the packaging machine based on a possible design of the folding contour;

FIG. 9 representations corresponding to FIG. 8 with differently designed folding contours; and FIG. 10 a representation corresponding to FIG. 8 and FIG. 9 with a further folding contour.

FIG. 1 schematically shows, in a plan view, a region of a packaging machine that comprises a feed region 17 and an insertion region 21, wherein a buffer region with here two schematically shown buffer spaces 65 is furthermore arranged at the side of the feed region 17 facing away from the insertion region 21.

Packaging machines for packaging food products are generally known so that they do not have to be looked at in detail here. The usual components of the packaging machine 23 are therefore not shown. These components are in particular a deep-drawing station for forming, for example, trough-shaped depressions in a film web and a sealing station for sealing the depressions into which products have previously been inserted at an insertion region.

In the packaging machine 23 in accordance with the invention, this insertion takes place at the insertion region 21 shown in FIG. 1, and indeed by means of a transfer device, not shown, in the form of a pick-and-place robot in whose working region the buffer region, the pick-up region 17, and the insertion region 21 are disposed.

Products (not shown) fed at the pick-up region 17 in a feed direction Z and disposed on a product carrier are picked up by means of the robot and are inserted into the depressions, also designated as package components here, that each form an insertion space 53 in the insertion region 21.

The insertion region 21 here comprises a format of 3×3 package components 53, and indeed three insertion rows 51 that extend in parallel with one another in the transport direction T and that each have three insertion spaces 53 arranged behind one another.

Each insertion row 51 is provided with a folding strip 55 that extends in the transport direction T and that is in each case arranged at the side of the respective insertion spaces 53 that faces away from the pick-up region 17. The folding strips 55 each form a folding abutment for a respective product carrier and each define a folding contour.

The pick-up region 17 is provided with a curved guide 63 that is provided here by two elevation strips that are spaced apart in parallel, that extend in parallel with the feed direction Z, and thus in parallel with the transport direction T, and that each form an elevated support section 63*b* for a conveyor band, not shown, of a conveying device forming the pick-up region 17.

The curved guide 63 and the folding strips 55 will be described in more detail below in connection with the further Figures.

Following the insertion region 21, viewed in the transport direction T, a pivot abutment 69 is provided for each insertion row 51. As described in the introductory part, this pivot abutment 69 is provided with a pivoting contour that ensures that, after the insertion of the carriers into the package components, when the packaging machine 23 performs its next work cycle, the tabs of the carriers are pivoted further in the direction of the base of the carrier by cooperation with the pivoting contour of the pivot abutments 69.

The packaging machine can have a plurality of such insertion regions 21 that are arranged behind one another in the transport direction T. A robot is then associated with each such insertion region 21 and picks up the carriers to be packaged, in each case together with the product disposed thereon, from a respective pick-up region 17. The structure that supports the robot and that can be integrated into the support frame of the packaging machine 23 is also designated as a robot cell, i.e. the packaging machine 23 can have a plurality of robot cells arranged behind one another in the transport direction T.

The packaging machine 23 works in cycles. A work cycle consists of a standstill phase and a movement phase, also designated as advancing, in which the package components are moved on a format by format basis. During a respective standstill phase, the package components located at the insertion spaces 53 and previously produced e.g. by deep-drawing are filled at the insertion region 21 with the respective products disposed on a carrier. At the same time, during a respective standstill phase at the deep-drawing station of the packaging machine, a format of depressions is formed in the material web and, at the sealing station disposed downstream, a format of filled package components is sealed by a material web also designated as a top film.

A format of package components does not have to be completely filled at an insertion region 21. The insertion of carriers, in each case together with the product disposed thereon, into a format can be distributed over a plurality of insertion regions 21 arranged behind one another.

FIG. 2 shows the three folding strips 55 at the insertion region 21 that each have a narrow upper side 55*a* and an inner side 55*b* facing the respective insertion spaces 53. A robot gripper of the robot serving as a transfer device 19 is partly shown above the insertion region 21.

The pick-up region 17 is provided with the mentioned elevation strips 63 that together form the curved guide for a conveyor band, not shown here. Each elevation strip 63 has a run-on ramp 63*a*, an adjoining support section 63*b*, and an in turn adjoining run-out ramp 63*c*.

FIG. 2 furthermore shows the buffer region with the two buffer spaces 65, said buffer region being provided at the side of the pick-up region 17 facing away from the insertion region 21. Furthermore, a further, identically designed section that comprises the buffer region, the pick-up region, the insertion region and the robot and that adjoins the insertion section of the packaging machine shown here in the transport direction T is partly shown in FIG. 2.

FIG. 3 shows the pick-up region 17, again without the mentioned conveyor band, to illustrate that the curved guide formed by the elevation strips 63 has a reduced width compared to the width of a product carrier 10. A product carrier 10 thus projecting at both sides can consequently be picked up safely and reliably by means of the transfer device.

The product carrier 10 is configured as a so-called L board here that has a base 11, which is provided with viewing openings, and a tab 15 that can be pivoted relative to the base 11 about a kink line 13 that is indicated as a dashed line here.

The feeding of these product carriers 10, on each of which products not shown here have been placed, takes place in an orientation of the carriers 10 such that the kink line 13 extends perpendicular to the transport direction T. The insertion of the carriers 10 into the package components takes place with the kink line 13 aligned in parallel with the transport direction T so that the carriers 10 have to be rotated by 90° after the picking up and before the insertion. This takes place by the transfer device described in more detail elsewhere.

The cross-section extending perpendicular to the transport direction T through the pick-up region 17 in accordance with FIG. 4 illustrates the different curvatures of the conveyor band 61 that forms a component of the conveying device by which the carriers 10, each provided with a product 16 disposed thereon, are fed to the pick-up region 17. The product 16 is schematically shown here as a shingled portion composed of a plurality of slices previously—as initially explained—cut off from a food product, for example bacon, by means of a high-performance slicer. The overlapping/shingled arrangement cannot be seen in FIG. 4 since it takes place perpendicular to the course of the kink line 13 (cf. FIG. 3).

The curvature of the conveyor band 61 changes in the transport direction T. Before running onto the elevation strips 63, the conveyor band 61 is at the lowest, normal level and is consequently not curved. In the region of the run-on ramp 63*a* and the run-out ramp 63*c* (cf. FIG. 3), the conveyor band 61 is at an approximately medium level and is already slightly curved.

The conveyor band 61 has the most pronounced curvature at the uppermost level when the conveyor band 61 is disposed on the support sections 63*b* of the elevation strips 63. FIG. 4 shows that, with respect to the width of the carriers 10, the curvature is sufficiently pronounced in order thus to achieve an exposure of the lower sides of the marginal regions of the carrier 10 at both sides, in other words to achieve a lateral overhang of the carrier 10 over that region of the conveyor band 61 that serves as a support 59 for the carrier 10.

In FIG. 5, it can be seen that the carrier 10 disposed on the buffer space 65 has been rotated by 90° after the picking up from the pick-up region 17 (cf. FIG. 3) so that the kink line 13 extends in parallel with the transport direction T. The carrier 10 has therefore been picked up and rotated by means of the transfer device, but for the time being it has not been inserted into one of the package components at the insertion region 21, but has been temporarily "parked" on one of the buffer spaces 65. For this purpose, the buffer space 65 is provided with a support 67 that comprises three support webs 68 spaced apart in parallel. Viewed in the transport direction T, a lateral overhang over the two outer support webs 68 hereby results, in other words an exposure of the lower sides of the marginal regions of the carrier 10 at both sides, so that the robot gripper forming the transfer device can engage under the base 11 of the carrier 10 with its two movable claws. For this purpose, the two outer support webs 68 are provided with outwardly slanting slopes.

FIG. 5 furthermore shows four openings 11*a* which are formed in the base 11 of the carrier 10 and through which the product arranged in the final package between the base 11 and the pivoted tab 15 is also visible to a purchaser from the side facing downwardly here in FIG. 5.

Robot grippers 19 serving as transfer devices, such as those shown in FIGS. 6*a* and 6*b* and 7*a* to 7*c*, are known with respect to their basic design and their basic functionality so that it is not necessary to look more closely at details in this respect.

The grippers 19 are each provided with a receiver for picking up a carrier 10 in the form of two claws 39 that are movable relative to one another in parallel with a longitudinal axis L (cf. FIG. 6*a*) of the gripper 19 between an open position (FIG. 6*a*) and a closed position (FIG. 6*b*). A pneumatic drive, which will not be looked at in detail here, is used for this movement of the claws 39.

As the comparison of FIGS. 6*a* and 6*b* shows, the claws 39 are moved under the base 11 of a respective carrier 10. Furthermore, a product holder 41 (cf. FIG. 6*a*) is moved downwardly to fix a food product, not shown here, disposed on the base 11 of the carrier 10. This takes place before the movement of the two claws 39 toward one another so that the carrier 10 does not slip, i.e. the carrier 10 together with the product disposed thereon remains in the respective desired position relative to the gripper.

Both in the embodiment in accordance with FIGS. 6*a* and 6*b* and in the embodiment in accordance with FIGS. 7*a* to 7*c*, the gripper 19 is in each case provided with a panel-shaped holding device 31 that is provided with openings and that is e.g. composed of sheet metal or plastic. The holding device 31 is fastened to a carrier section 45 that is in turn attached to a frame 46 along which the carrier section 45 and thus the holding device 31 can be moved perpendicular to the longitudinal axis L by means of a drive, not shown. Alternatively, provision can be made that the holding device 31 can be moved relative to a holding section in a direction perpendicular to the longitudinal axis L, wherein this holding section is then either additionally movable itself or arranged in a stationary manner.

With respect to a vertical center plane of the gripper 19 extending centrally through the two claws 39, the holding device 31 is arranged off-center. A straight-line holding edge 43 formed by the lower end of the holding device 31 and extending in parallel with the longitudinal axis L is thus located laterally—viewed in a direction perpendicular to the longitudinal axis L—outside the range of movement of the claws 39.

The holding device 31 is angled outwardly in a lower region 31*b* provided with the holding edge 43 and therefore does not extend in the vertical direction with this lower region 31*b*. In contrast, an upper region 31*a* of the holding device 31, via which the holding device 31 is fixed to the carrier section 45, extends in the vertical direction.

With respect to an upwardly facing support surface, which is defined by the claws 39, for the carrier 10, the holding device 31 is arranged such that the holding edge 43 of the holding device extends approximately in the plane defined by this support surface. When the carrier 10 is disposed on the claws 39, the carrier 10 is consequently acted on from above by the holding device 31 by means of its holding edge 43.

When picking up a respective carrier 10, the gripper 19 is positioned relative to the carrier 10 such that the holding edge 43 acts on the carrier 10 along the kink line 13.

As already mentioned in the introductory part, a kink line 13 can already be present in the form of a deliberate weakening of the carrier 10 between the base 11 and the tab 15. However, it is also possible to intentionally produce such a weakening by means of the holding device 31 when picking up the carrier 10. As the small representations at the left in FIG. 6*a* show, the holding edge 43 can for this purpose be provided with a holding contour 43*a* that deviates from a rectilinear course and that can, for example, have a corrugated, a toothed or a serrated course.

With the grippers 19 in accordance with FIGS. 6*a* and 6*b*, the folding of the carrier 10, i.e. the pivoting of the tab 15 relative to the base 11, takes place by cooperation with a respective folding strip 55 of the packaging machine, as described in more detail below.

The gripper in accordance with FIGS. 7*a* to 7*c* differs from that of FIGS. 6*a* and 6*b* in that the gripper 19 itself is capable of pivoting the tab 15 relative to the base 11. For this purpose, the gripper 19 is provided with a pivot device 33 at each of its two claws 39. Apart from this, the two grippers 19 do not differ so that reference is in this respect made to the statements on FIGS. 6*a* and 6*b*.

Each pivot device 33 comprises a holder 47 that is fastened to the respective claw 39 and that supports an elongated pivoting member 49 extending in parallel with the longitudinal axis L. This "pivot finger" 49 can thus be jointly moved by means of the respective claw 39 in parallel with the longitudinal direction L, and indeed between a passive position in accordance with FIG. 7*a* corresponding to the open position of the two claws 39 and an active position in accordance with FIG. 7*b* corresponding to the closed position of the two claws 39. This active position of the pivoting members 39 corresponds to a starting position in which the pivoting members 39 are pushed under the tab 15 to be pivoted. Starting from this starting position in accordance with FIG. 7*b*, the pivoting members 49 can each be moved by means of a drive into an end position in accordance with FIG. 7*c* in which the tab 15 of the carrier 10 has been pivoted by means of the pivoting members 49 into an approximately perpendicular position relative to the base 11 of the carrier 10.

The working movement of the pivoting members 49 between the starting position in accordance with FIG. 7*b* and the end position in accordance with FIG. 7*c* is a linear movement that is in each case effected by means of a pneumatic cylinder 50. Alternative movement sequences for the pivoting members 49 are possible, for example, rotary movements or pivot movements.

On a pivoting of the tab 15 by means of the pivoting members 49, the carrier 10 is secured against a lifting off from the claws 39 by the holding device 31 effective at the bending line 13 (cf. FIG. 7*a*) with its holding edge 43.

FIGS. 8 and 9 each schematically illustrate the cooperation of the holding device 31 with the folding contour 29, which is defined by the respective folding abutment 55, for pivoting the tab 15 relative to the base 11 of a respective carrier.

In each case, the rear side of a claw 39 of the otherwise not shown gripper 19 is shown, with which gripper 19 the respective carrier has been picked up and is to be inserted into a provided package component 25 by a downward movement. The package component 25 is formed by a depression 28 that was previously formed at a deep-drawing station of the packaging machine by a deep-drawing in a material web 27 in the form of a bottom film.

The folding abutment 55 that is, for example, formed by a folding strip in accordance with FIG. 1 and FIGS. 2 and 3 has an upper side 55*a* and an inner side 55*b* that faces inwardly, i.e. towards the insertion space 53, and that extends in the vertical direction here. The folding contour 29 is here consequently formed by a vertical operative section 57 of the folding abutment 55. The folding abutment 55 is arranged in an overlapping manner with the corresponding lateral boundary of the depression 28 so that an imaginary downward extension of the folding contour 29 ends within the depression 28.

As already mentioned in connection with FIGS. 6*a* and 6*b* and 7*a* to 7*c*, the panel-shaped holding device 31 that is, for example, formed by a metal sheet or a plastic sheet is angled at its lower region 31*b* so that the vertically extending upper region 31*a* is offset inwardly with respect to the holding edge 43 formed at the free end of the lower region 31*b*, i.e. away from the vertical plane defined by the vertical operative section 57 of the folding contour 29. It is hereby ensured that neither the holding device 31 itself nor the carrier section 45, to which the holding device 31 is fastened with its upper region 31*a*, can abut the abutment strip 55 when the gripper 19 and thus the holding device 31 are moved downwardly.

The holding edge 43 is effective at the kink line 13 between the tab 15 and the base 11 of the carrier so that, as the middle representation in FIG. 8 shows, the tab 15 is pivoted about the kink line 13 relative to the base 11 through the cooperation of the holding edge 43 and the inner side 55*b* of the folding abutment 55. In this respect, the gripper 19 is programmed such that it moves on a folding path that ensures that the holding edge 43 moves close to the inner side 55*b* of the folding abutment 55 during the downward movement.

The inwardly facing slope at the upper side 55*a* of the folding abutment 55 ensures that the holding edge 43 would be deflected inwardly if the gripper 19 were located closer to the folding abutment 55 during its downward movement.

As the representation at the right in FIG. 8 shows, the tab 15 has been pivoted by 90° relative to the base 11 into a position at a right angle to the base 11 through the cooperation of the holding device 31 and the folding abutment 55. As soon as the claws 39 of the gripper 19 are moved apart, the carrier 10 together with the product disposed thereon falls into the depression 28. On the further movement of the package component 25 in the packaging machine, the upwardly pivoted tab 15 is pivoted further in the direction of the base 11 by means of the pivot abutment 69 (cf. FIG. 1) in order to reach the desired end position that is required to enable the sealing of the package at the sealing station.

FIG. 9 shows three possible alternative embodiments of the folding abutment 55. At the left in FIG. 9, a folding abutment 55 arranged in an inclined manner is shown by way of example and is provided with an inclined operative section 35 at its inner side. The movement of the gripper 19 to insert the carrier 10 into the package component 25 can differ here from a pure vertical downward movement. The gripper 19 can e.g. first be moved further outwardly and then, during its downward movement, can be moved inwardly at the same time in order, in this way, to pivot the tab 15 through the cooperation of the holding edge 43 and the oblique operative section 35.

In the examples in accordance with the middle representation and the right representation in FIG. 9, the folding abutment 55 is in each case again provided with a vertical operative section 57 of the folding contour 29 that is, however, adjoined in the lower region by an undercut 37 formed at the inner side of the folding abutment 55. By means of the holding edge 43, the holding device 31 presses the region of the tab 15 adjoining the kink line 13 into the undercut 37, whereby the holding tab 15 is aligned in accordance with the area upwardly bounding the undercut 37 and is in each case pivoted further inwardly in accordance with the two examples shown herein.

The movement of the holding edge 43 into the undercut 37 can either be achieved by a suitably controlled transverse movement of the gripper 19 that takes place as soon as the region of the undercut 37 is reached during the downward movement. Alternatively, the holding device 31 can be deflectable by elastic deformation so that the movement of the gripper 19 can be controlled such that, during the downward movement, the holding device 31 is deflected inwardly when it cooperates with the folding abutment 55 via its holding edge 43. The return force of the elastic deformation of the holding device 31 that takes place in this respect then ensures that the lower region 31*b* of the holding device 31 automatically presses the lower region of the tab 15 into the undercut 37 as soon as the latter is reached during the downward movement.

In the middle example of FIG. 9, the undercut 37 is bounded by a lower run-out slope so that the holding device 31 can automatically move out of the undercut 37 via its holding edge 43 when the gripper 19 is moved further downwardly in the vertical direction.

In the rightmost example in FIG. 9, the undercut 37 is provided with a step in the lower region so that a transverse movement of the gripper 19 away from the inner side of the folding abutment 55 is required to be able to move the carrier 10 further downwardly in the direction of the package component 25.

In the embodiment of FIG. 10, in contrast to the embodiments shown in FIGS. 8 and 9, to which reference is made in order to avoid a repeat description with respect to the agreements, a projection 38 is formed as an operative section at the inner side 55*b* of the folding abutment 55. The projection 38 comprises an upper part section 38*a* that leads inwardly and a lower part section 38*b* that leads back outwardly again from the upper part section 38*b*. Both part sections 38*a*, 38*b* are straight, wherein a curved design would alternatively be possible.

On the downward movement of the gripper, the lower region 31*b* of the holding device 31 is first elastically deflected inwardly by the upper part section 38*a*, but then returns into the starting position due to the return force, wherein the tab 15 of the carrier 10 is aligned at the lower part section 38*b* and is thus pivoted beyond an angle of 90° in the direction of the base 11.

REFERENCE NUMERAL LIST

10 carrier
11 base
11*a* opening
13 kink line
15 tab
16 product
17 pick-up region
19 transfer device
21 insertion region
23 packaging machine
25 package component
27 material web
28 depression
29 folding contour
31 holding device
31*a* upper region
31*b* lower region
33 pivot device
35 inclined operative section
37 operative section as an undercut
38 operative section as a projection
38*a* upper part section of the projection
38*b* lower part section of the projection
39 support
41 product holding-down device
43 holding edge
43*a* holding contour
45 carrier section
46 frame
47 holder
49 pivoting member
50 working cylinder
51 insertion row
53 insertion space
55 folding abutment
55*a* upper side
55*b* inner side
57 vertical operative section
59 support of the conveying device
61 endless conveying means
63 curved guide
63*a* run-on ramp
63*b* support section
63*c* run-out ramp
65 buffer space
67 support of the buffer space
68 web
69 pivot abutment
L longitudinal axis
T direction of transport
Z feed direction

The invention claimed is:

1. A packaging machine for packaging food products, wherein the products are each disposed on a carrier that has a base and a tab pivotable relative to the base about a kink line, wherein the packaging machine comprises a pick-up region, a transfer device, and an insertion region, wherein during operation of the packaging machine each carrier, together with the product disposed thereon, is fed to the pick-up region, is picked up by the transfer device, is fed by means of the transfer device to the insertion region and is inserted with a downward movement of the transfer device into a package component, wherein the insertion region comprises one or more parallel insertion rows along which the package components are moved through the insertion region in a transport direction, each insertion row having one or more insertion spaces at which a respective carrier together with the product disposed thereon is inserted by the transfer device into a package component, and wherein a folding abutment projecting upwardly beyond the top of a respective package component is arranged laterally next to each insertion space and said folding abutment defines, with its upper side and its inner side facing the insertion space, a folding contour which a respective carrier abuts with its tab during the downward movement and by which the tab is pivoted relative to the base.

2. A packaging machine in accordance with claim 1, wherein the folding abutment is configured to be removable from the packaging machine or wherein the position of the folding abutment is adjustable relative to the respective insertion space.

3. A packaging machine in accordance with claim 1, wherein the folding abutment is arranged at the side of the respective insertion space facing away from the pick-up region.

4. A packaging machine in accordance with claim 1, wherein the folding abutment is configured as a folding strip extending in the transport direction.

5. A packaging machine in accordance with claim 4, wherein the folding strip extends over a plurality of insertion spaces of the respective insertion row.

6. A packaging machine in accordance with claim 1, wherein the insertion region comprises a plurality of insertion rows, each having a plurality of insertion spaces, and wherein a folding strip extending over a plurality of insertion spaces is arranged at each insertion row.

7. A packaging machine in accordance with claim 1, wherein the folding contour extends exclusively vertically, or wherein the folding contour extends exclusively vertically with the exception of a chamfered or rounded inlet section at the upper side of the folding abutment, or wherein the folding contour comprises a vertically extending operative section.

8. A packaging machine in accordance with claim 1, wherein the folding contour comprises in an upper region a non-vertically extending operative section that is directed towards the respective insertion space and that extends at least partly obliquely or in a curved manner.

9. A packaging machine in accordance with claim 1, wherein the folding contour at the inner side of the folding abutment comprises at least one operative section configured as an undercut or as a projection.

10. A packaging machine in accordance with claim 1, wherein a pivot abutment is arranged in the insertion region or, with respect to the transport direction, adjoining the insertion region for the or each insertion row, said pivot abutment defining a pivoting contour that changes in the transport direction and that is shaped such that, on a moving past of a respective carrier inserted into a package component, the tab of said respective carrier is pivoted further in the direction of the base of the carrier by cooperation with the pivoting contour.

11. A packaging machine in accordance with claim 1, wherein the pick-up region comprises a conveying device via which each carrier, together with the product disposed thereon, is fed and which has in the pick-up region, a curved support or a support having a reduced width for the carriers that enables an overhang of the carriers at both sides.

12. A packaging machine in accordance with claim 11, wherein the conveying device comprises an endless conveying means that serves as a support and that is guided in the pick-up region via a curved guide having a reduced width compared to the endless conveying means.

13. A packaging machine in accordance with claim 12, wherein the curved guide comprises one or more elevation strips for the endless conveying means, said elevation strips extending in the transport direction and each comprising a run-on ramp, a run-out ramp and therebetween an elevated support section for the endless conveying means.

14. A packaging machine in accordance with claim 1, wherein at least one buffer space for at least one carrier is arranged at the side of the pick-up region facing away from the insertion region, wherein, when a respective carrier is placed on the buffer space, the transfer device is configured to pick up the carrier from the buffer space.

15. A packaging machine in accordance with claim 14, wherein the buffer space is provided with a support for the carriers that enables an overhang of the carriers at both sides.

* * * * *